US 8,828,423 B2

(12) United States Patent
Boghani et al.

(10) Patent No.: US 8,828,423 B2
(45) Date of Patent: Sep. 9, 2014

(54) DELIVERY SYSTEM FOR ACTIVE COMPONENTS AS PART OF AN EDIBLE COMPOSITION HAVING PRESELECTED TENSILE STRENGTH

(75) Inventors: Navroz Boghani, Wharton, NJ (US); Petros Gebreselassie, Piscataway, NJ (US)

(73) Assignee: Intercontinental Great Brands LLC, East Hanover, NJ (US)

(*) Notice: Subject to any disclaimer, the term of this patent is extended or adjusted under 35 U.S.C. 154(b) by 919 days.

(21) Appl. No.: 11/083,968

(22) Filed: Mar. 21, 2005

(65) Prior Publication Data

US 2005/0220867 A1 Oct. 6, 2005

Related U.S. Application Data

(63) Continuation of application No. PCT/US2004/037185, filed on Nov. 22, 2004, which is a continuation of application No. 10/719,298, filed on Nov. 21, 2003.

(51) Int. Cl.
*A61K 9/68* (2006.01)

(52) U.S. Cl.
USPC .......................................... 424/440

(58) Field of Classification Search
None
See application file for complete search history.

(56) References Cited

U.S. PATENT DOCUMENTS

| | | |
|---|---|---|
| 1,633,336 A | 6/1927 | Larson |
| 1,936,456 A | 11/1933 | Larson |
| 1,952,886 A | 3/1934 | O'Brien |
| 2,191,199 A | 2/1940 | Hall |
| 2,197,719 A | 4/1940 | Conner |
| 2,876,167 A | 3/1959 | Manahan |
| 2,886,440 A | 5/1959 | Kramer et al. |
| 2,886,441 A | 5/1959 | Kramer et al. |
| 2,886,442 A | 5/1959 | Kramer et al. |
| 2,886,443 A | 5/1959 | Rosenthal et al. |
| 2,886,444 A | 5/1959 | Rosenthal et al. |
| 2,886,445 A | 5/1959 | Rosenthal et al. |
| 2,886,446 A | 5/1959 | Kramer et al. |
| 2,886,449 A | 5/1959 | Rosenthal et al. |
| 3,004,897 A | 10/1961 | Shore |
| 3,052,552 A | 9/1962 | Koener et al. |
| 3,117,027 A | 1/1964 | Lindlof et al. |
| 3,124,459 A | 3/1964 | Erwin et al. |
| 3,159,585 A | 12/1964 | Evans et al. |
| 3,241,520 A | 3/1966 | Wurster et al. |
| 3,341,416 A | 9/1967 | Anderson et al. |

(Continued)

FOREIGN PATENT DOCUMENTS

| | | |
|---|---|---|
| CA | 1208966 | 5/1986 |
| CA | 2238925 | 11/1999 |

(Continued)

OTHER PUBLICATIONS

Machine translation of JP 2623769 B2.*

(Continued)

*Primary Examiner* — Paul Dickinson

(74) *Attorney, Agent, or Firm* — Cantor Colburn LLP

(57) ABSTRACT

A delivery system for inclusion in an edible composition is formulated to have at least one active component encapsulated within an encapsulating material, whereby the delivery system has a tensile strength suitable for delivering the active component at a desired release rate.

16 Claims, 4 Drawing Sheets

(56) References Cited

U.S. PATENT DOCUMENTS

| | | | |
|---|---|---|---|
| 3,475,533 A | 10/1969 | Mayrand et al. | |
| 3,538,230 A | 11/1970 | Pader et al. | |
| 3,664,962 A | 5/1972 | Kelly et al. | |
| 3,664,963 A | 5/1972 | Pasin | |
| 3,677,771 A | 7/1972 | Kolar, Jr. | |
| 3,691,090 A | 9/1972 | Kitajima et al. | |
| 3,795,744 A | 3/1974 | Ogawa et al. | |
| 3,819,838 A | 6/1974 | Smith et al. | |
| 3,821,417 A | 6/1974 | Westall et al. | |
| 3,826,847 A | 7/1974 | Ogawa et al. | |
| 3,857,964 A | 12/1974 | Yolles | |
| 3,862,307 A | 1/1975 | Di Giulio | |
| 3,872,021 A | 3/1975 | McKnight | |
| 3,878,938 A | 4/1975 | Venables et al. | |
| 3,897,566 A | 7/1975 | Bahoshy et al. | |
| 3,912,817 A | 10/1975 | Sapsowitz | |
| 3,930,026 A | 12/1975 | Clark | |
| 3,943,258 A | 3/1976 | Bahoshy et al. | |
| 3,962,416 A | 6/1976 | Katzen | |
| 3,962,463 A | 6/1976 | Witzel | |
| 3,974,293 A | 8/1976 | Witzel | |
| 3,984,574 A | 10/1976 | Comollo | |
| 4,032,661 A | 6/1977 | Rowsell et al. | |
| 4,033,994 A | 7/1977 | Watson et al. | |
| 4,037,000 A | 7/1977 | Burge et al. | |
| 4,045,581 A | 8/1977 | Mackay et al. | |
| 4,059,118 A | 11/1977 | Watson et al. | |
| 4,060,091 A | 11/1977 | Watson et al. | |
| 4,070,449 A | 1/1978 | Rowsell et al. | |
| 4,083,995 A | 4/1978 | Mitchell et al. | |
| 4,107,360 A | 8/1978 | Schmidgall | |
| 4,130,638 A | 12/1978 | Dhabhar et al. | |
| 4,136,163 A | 1/1979 | Watson et al. | |
| 4,139,639 A | 2/1979 | Bahoshy et al. | |
| 4,148,872 A | 4/1979 | Wagenknecht et al. | |
| 4,150,112 A | 4/1979 | Wagenknecht et al. | |
| 4,156,715 A | 5/1979 | Wagenknecht et al. | |
| 4,156,716 A | 5/1979 | Wagenknecht et al. | |
| 4,157,385 A | 6/1979 | Wagenknecht et al. | |
| 4,159,315 A | 6/1979 | Wagenknecht et al. | |
| 4,160,054 A | 7/1979 | Wagenknecht et al. | |
| 4,160,820 A | 7/1979 | Wagenknecht et al. | |
| 4,187,320 A | 2/1980 | Koch et al. | |
| 4,193,936 A | 3/1980 | Watson et al. | |
| 4,208,431 A | 6/1980 | Friello et al. | |
| 4,217,368 A | 8/1980 | Witzel et al. | |
| 4,224,345 A | 9/1980 | Tezuka et al. | |
| 4,230,688 A | 10/1980 | Rowsell et al. | |
| 4,271,197 A | 6/1981 | Hopkins et al. | |
| 4,271,199 A | 6/1981 | Cherukuri et al. | |
| 4,276,312 A | 6/1981 | Merritt | |
| 4,295,845 A | 10/1981 | Sepulveda et al. | |
| 4,314,990 A | 2/1982 | Denny, Jr. et al. | |
| 4,340,583 A | 7/1982 | Wason | |
| 4,352,822 A | 10/1982 | Cherukuri et al. | |
| 4,352,823 A | 10/1982 | Cherukuri et al. | |
| 4,352,825 A | 10/1982 | Cherukuri et al. | |
| 4,363,756 A | 12/1982 | Sepulveda et al. | |
| 4,370,350 A | 1/1983 | Fisher et al. | |
| 4,384,004 A | 5/1983 | Cea et al. | |
| 4,386,106 A | 5/1983 | Merritt et al. | |
| 4,388,328 A | 6/1983 | Glass | |
| 4,452,821 A | 6/1984 | Gergely | |
| 4,457,857 A | 7/1984 | Sepulveda et al. | |
| 4,459,425 A | 7/1984 | Amano et al. | |
| 4,472,437 A | 9/1984 | Corsello et al. | |
| 4,485,118 A | 11/1984 | Carroll et al. | |
| 4,497,832 A | 2/1985 | Cherukuri et al. | |
| 4,513,012 A | 4/1985 | Carroll et al. | |
| 4,515,769 A | 5/1985 | Marritt et al. | |
| 4,518,615 A | 5/1985 | Cherukuri et al. | |
| 4,568,560 A | 2/1986 | Schobel | |
| 4,585,649 A | 4/1986 | Lynch | |
| 4,590,075 A | 5/1986 | Wei et al. | |
| 4,597,970 A | 7/1986 | Sharma et al. | |
| 4,613,512 A | 9/1986 | Barnett et al. | |
| 4,614,649 A | 9/1986 | Gorman et al. | |
| 4,614,654 A | 9/1986 | Ream et al. | |
| 4,627,987 A | 12/1986 | Barnett et al. | |
| 4,634,593 A | 1/1987 | Stroz et al. | |
| 4,663,152 A | 5/1987 | Barth et al. | |
| 4,673,577 A | 6/1987 | Patel | |
| 4,711,784 A | 12/1987 | Yang | |
| 4,722,845 A | 2/1988 | Cherukuri et al. | |
| 4,726,953 A | 2/1988 | Carroll et al. | |
| 4,740,376 A | 4/1988 | Yang | |
| 4,741,905 A | 5/1988 | Huzinec | |
| 4,749,575 A | 6/1988 | Rotman | |
| 4,751,095 A | 6/1988 | Karl et al. | |
| 4,752,481 A | 6/1988 | Dokuzovic | |
| 4,753,790 A | 6/1988 | Silva et al. | |
| 4,764,382 A * | 8/1988 | Kydonieus et al. | 424/449 |
| 4,771,784 A | 9/1988 | Kozin et al. | |
| 4,786,502 A | 11/1988 | Chapura et al. | |
| 4,800,087 A | 1/1989 | Mehta | |
| 4,803,082 A | 2/1989 | Cherukuri et al. | |
| 4,804,548 A | 2/1989 | Sharma et al. | |
| 4,816,265 A | 3/1989 | Cherukuri et al. | |
| 4,822,599 A | 4/1989 | Mitra | |
| 4,824,681 A | 4/1989 | Schobel et al. | |
| 4,828,845 A | 5/1989 | Zamudio-Tena et al. | |
| 4,828,857 A | 5/1989 | Sharma et al. | |
| 4,842,762 A | 6/1989 | Sabol, Jr. et al. | |
| 4,863,745 A | 9/1989 | Zibell | |
| 4,871,570 A | 10/1989 | Barnett et al. | |
| 4,904,482 A | 2/1990 | Patel et al. | |
| 4,911,934 A | 3/1990 | Yang et al. | |
| 4,915,958 A | 4/1990 | Faust et al. | |
| 4,918,182 A | 4/1990 | Jackson et al. | |
| 4,919,841 A | 4/1990 | Kamel et al. | |
| 4,923,684 A | 5/1990 | Ibrahim et al. | |
| 4,927,646 A | 5/1990 | Jenner et al. | |
| 4,929,447 A * | 5/1990 | Yang | 424/440 |
| 4,931,293 A | 6/1990 | Cherukuri et al. | |
| 4,933,190 A | 6/1990 | Cherukuri et al. | |
| 4,940,588 A | 7/1990 | Sparks et al. | |
| 4,952,402 A | 8/1990 | Sparks et al. | |
| 4,952,407 A | 8/1990 | Record et al. | |
| 4,954,353 A | 9/1990 | Cherukuri et al. | |
| 4,971,797 A | 11/1990 | Cherukuri et al. | |
| 4,971,806 A | 11/1990 | Cherukuri et al. | |
| 4,978,537 A | 12/1990 | Song | |
| 4,981,698 A | 1/1991 | Cherukuri et al. | |
| 4,985,236 A | 1/1991 | Ibrahim et al. | |
| 4,986,991 A | 1/1991 | Yatka et al. | |
| 4,997,659 A | 3/1991 | Yatka et al. | |
| 5,004,595 A | 4/1991 | Cherukuri et al. | |
| 5,009,893 A | 4/1991 | Cherukuri et al. | |
| 5,009,900 A | 4/1991 | Levine et al. | |
| 5,017,385 A | 5/1991 | Wienecke | |
| 5,035,882 A | 7/1991 | Hussein et al. | |
| 5,041,294 A | 8/1991 | Patel | |
| 5,043,154 A | 8/1991 | Gaffar et al. | |
| 5,043,169 A | 8/1991 | Cherukuri et al. | |
| 5,057,327 A | 10/1991 | Yatka et al. | |
| 5,057,328 A | 10/1991 | Cherukuri et al. | |
| 5,059,429 A | 10/1991 | Cherukuri et al. | |
| 5,064,658 A | 11/1991 | Cherukuri et al. | |
| 5,073,389 A | 12/1991 | Wienecke | |
| 5,080,877 A | 1/1992 | Chane-Ching et al. | |
| 5,082,671 A | 1/1992 | Cherukuri | |
| 5,084,278 A | 1/1992 | Mehta | |
| 5,096,699 A | 3/1992 | Gaffar et al. | |
| 5,096,701 A | 3/1992 | White, Jr. et al. | |
| 5,100,678 A | 3/1992 | Reed et al. | |
| 5,108,763 A | 4/1992 | Chau et al. | |
| 5,126,151 A | 6/1992 | Bodor et al. | |
| 5,139,793 A | 8/1992 | Johnson et al. | |
| 5,139,794 A | 8/1992 | Patel et al. | |
| 5,139,798 A | 8/1992 | Yatka et al. | |
| 5,154,939 A | 10/1992 | Broderick et al. | |
| 5,158,790 A | 10/1992 | Witkewitz et al. | |
| 5,164,210 A | 11/1992 | Campbell et al. | |
| 5,169,657 A | 12/1992 | Yatka et al. | |

(56) References Cited

U.S. PATENT DOCUMENTS

| | | |
|---|---|---|
| 5,169,658 A | 12/1992 | Yatka et al. |
| 5,174,514 A | 12/1992 | Prodi |
| 5,176,900 A | 1/1993 | White, Jr. et al. |
| 5,198,251 A | 3/1993 | Song et al. |
| 5,202,112 A | 4/1993 | Prencipe et al. |
| 5,208,009 A | 5/1993 | Gaffar et al. |
| 5,226,335 A | 7/1993 | Sitte et al. |
| 5,227,154 A | 7/1993 | Reynolds |
| 5,227,182 A | 7/1993 | Song et al. |
| 5,229,148 A | 7/1993 | Copper |
| 5,240,710 A | 8/1993 | Bar-Shalom et al. |
| 5,244,670 A | 9/1993 | Upson et al. |
| 5,256,402 A | 10/1993 | Prencipe et al. |
| 5,266,335 A | 11/1993 | Cherukuri et al. |
| 5,266,592 A | 11/1993 | Grub et al. |
| 5,273,741 A | 12/1993 | Gaftar et al. |
| 5,284,659 A | 2/1994 | Cherukuri et al. |
| 5,300,283 A | 4/1994 | Prencipe et al. |
| 5,300,305 A | 4/1994 | Stapler et al. |
| 5,334,375 A | 8/1994 | Nabi et al. |
| 5,334,396 A | 8/1994 | Yatka |
| 5,336,509 A | 8/1994 | McGrew et al. |
| 5,352,439 A | 10/1994 | Norfleet et al. |
| 5,364,627 A | 11/1994 | Song |
| 5,372,824 A | 12/1994 | Record et al. |
| 5,380,530 A | 1/1995 | Hill |
| 5,385,729 A | 1/1995 | Prencipe et al. |
| 5,391,315 A | 2/1995 | Ashkin |
| 5,405,604 A | 4/1995 | Hall |
| 5,407,665 A | 4/1995 | McLaughlin et al. |
| 5,413,799 A | 5/1995 | Song et al. |
| 5,415,880 A | 5/1995 | Song et al. |
| 5,429,827 A | 7/1995 | Song et al. |
| 5,431,930 A | 7/1995 | Patel et al. |
| 5,437,876 A | 8/1995 | Synosky et al. |
| 5,437,878 A | 8/1995 | Panhorst et al. |
| 5,451,404 A | 9/1995 | Furman |
| 5,458,879 A | 10/1995 | Singh et al. |
| 5,462,754 A | 10/1995 | Synosky et al. |
| 5,474,787 A | 12/1995 | Grey et al. |
| 5,480,668 A | 1/1996 | Nofre et al. |
| 5,487,902 A | 1/1996 | Andersen et al. |
| 5,494,689 A | 2/1996 | Lee et al. |
| 5,498,378 A | 3/1996 | Tsaur et al. |
| 5,501,864 A | 3/1996 | Song et al. |
| 5,503,823 A | 4/1996 | Norfleet et al. |
| 5,505,933 A | 4/1996 | Norfleet et al. |
| 5,523,098 A | 6/1996 | Synosky et al. |
| 5,532,004 A | 7/1996 | Bell et al. |
| 5,545,424 A | 8/1996 | Nakatsu et al. |
| 5,582,816 A | 12/1996 | Mandanas et al. |
| 5,589,160 A | 12/1996 | Rice |
| 5,589,194 A | 12/1996 | Tsuei et al. |
| 5,599,527 A | 2/1997 | Hsu et al. |
| 5,603,920 A | 2/1997 | Rice |
| 5,603,971 A | 2/1997 | Porzio et al. |
| 5,618,517 A | 4/1997 | Miskewitz |
| 5,626,892 A | 5/1997 | Kehoe et al. |
| 5,629,035 A | 5/1997 | Miskewitz |
| 5,633,027 A | 5/1997 | Cherukuri et al. |
| 5,637,618 A | 6/1997 | Kurtz et al. |
| 5,645,821 A | 7/1997 | Libin |
| 5,651,958 A | 7/1997 | Rice |
| 5,658,553 A | 8/1997 | Rice |
| 5,676,932 A | 10/1997 | Wason et al. |
| 5,693,334 A | 12/1997 | Miskewitz |
| 5,698,215 A | 12/1997 | Kalili et al. |
| 5,702,687 A | 12/1997 | Miskewitz |
| 5,713,738 A | 2/1998 | Yarborough |
| 5,716,601 A | 2/1998 | Rice |
| 5,725,865 A | 3/1998 | Mane et al. |
| 5,736,175 A * | 4/1998 | Cea et al. ............................ 426/6 |
| 5,741,524 A | 4/1998 | Staniforth et al. |
| 5,744,180 A | 4/1998 | Cherukuri et al. |
| 5,756,074 A | 5/1998 | Ascioone et al. |
| 5,783,725 A | 7/1998 | Kuhn et al. |
| 5,789,002 A | 8/1998 | Duggan et al. |
| 5,800,848 A | 9/1998 | Yatka et al. |
| 5,824,291 A | 10/1998 | Howard |
| 5,853,758 A | 12/1998 | Lo |
| 5,866,166 A | 2/1999 | Staniforth et al. |
| 5,869,028 A | 2/1999 | McGill et al. |
| 5,879,728 A | 3/1999 | Graff et al. |
| 5,912,007 A | 6/1999 | Pan et al. |
| 5,939,051 A | 8/1999 | Santalucia et al. |
| 5,942,211 A | 8/1999 | Harper et al. |
| 6,027,746 A | 2/2000 | Lech |
| 6,056,992 A | 5/2000 | Lew |
| 6,159,509 A | 12/2000 | Johnson et al. |
| 6,174,514 B1 | 1/2001 | Cherukuri et al. |
| 6,190,591 B1 | 2/2001 | Van Lengerich |
| 6,190,644 B1 | 2/2001 | McClanahan et al. |
| 6,239,690 B1 | 5/2001 | Burbidge et al. |
| 6,261,540 B1 | 7/2001 | Nelson |
| 6,290,933 B1 | 9/2001 | Durga et al. |
| 6,306,429 B1 | 10/2001 | Beanlin-Kelly |
| 6,365,209 B2 | 4/2002 | Cherukuri |
| 6,379,654 B1 | 4/2002 | Gebreselassie et al. |
| 6,413,573 B1 | 7/2002 | Reichart et al. |
| 6,416,744 B1 | 7/2002 | Robinson et al. |
| 6,428,827 B1 | 8/2002 | Song et al. |
| 6,436,461 B1 | 8/2002 | Boumeesters et al. |
| 6,471,945 B2 | 10/2002 | Luo et al. |
| 6,475,469 B1 | 11/2002 | Montgomery |
| 6,479,071 B2 | 11/2002 | Holme et al. |
| 6,485,739 B2 | 11/2002 | Luo et al. |
| 6,506,366 B1 | 1/2003 | Leinen et al. |
| 6,534,091 B1 | 3/2003 | Garces Garces et al. |
| 6,537,595 B1 | 3/2003 | Hyodo et al. |
| 6,555,093 B2 | 4/2003 | Alvarez Hernandez |
| 6,555,145 B1 | 4/2003 | Cherukuri |
| 6,599,542 B1 | 7/2003 | Abdel-Malik et al. |
| 6,623,266 B2 | 9/2003 | Jani et al. |
| 6,627,233 B1 | 9/2003 | Wolf et al. |
| 6,673,844 B2 | 1/2004 | Kumamoto et al. |
| 6,685,916 B1 | 2/2004 | Holme et al. |
| 6,692,778 B2 | 2/2004 | Yatka et al. |
| 6,696,044 B2 | 2/2004 | Luo et al. |
| 6,717,167 B2 | 4/2004 | Noda |
| 6,759,066 B2 | 7/2004 | Savage et al. |
| 6,780,443 B1 | 8/2004 | Nakatsu et al. |
| 6,838,106 B2 | 1/2005 | Kumamoto et al. |
| 6,974,597 B2 | 12/2005 | Ohta et al. |
| 6,998,144 B2 | 2/2006 | Merkel et al. |
| 7,022,352 B2 | 4/2006 | Castro et al. |
| 7,025,999 B2 | 4/2006 | Johnson et al. |
| 7,189,760 B2 | 3/2007 | Erman et al. |
| 7,507,427 B2 | 3/2009 | Andersen et al. |
| 8,389,031 B2 | 3/2013 | Boghani et al. |
| 8,389,032 B2 | 3/2013 | Boghani et al. |
| 8,591,968 B2 | 11/2013 | Boghani et al. |
| 8,591,972 B2 | 11/2013 | Boghani et al. |
| 8,591,973 B2 | 11/2013 | Boghani et al. |
| 8,591,974 B2 | 11/2013 | Boghani et al. |
| 8,597,703 B2 | 12/2013 | Boghani et al. |
| 2001/0008635 A1 | 7/2001 | Quellet et al. |
| 2001/0021404 A1 | 9/2001 | Uhlemann et al. |
| 2002/0044968 A1 | 4/2002 | Van Lengerich |
| 2002/0122842 A1 | 9/2002 | Seielstad |
| 2002/0150616 A1 | 10/2002 | Gerebern |
| 2003/0004215 A1 | 1/2003 | Van Laere et al. |
| 2003/0077362 A1 | 4/2003 | Panhorst |
| 2003/0097088 A1 * | 5/2003 | Pacetti ............................ 604/19 |
| 2003/0099740 A1 | 5/2003 | Colle |
| 2003/0113274 A1 | 6/2003 | Holme |
| 2003/0236183 A1 | 12/2003 | De Bruijn et al. |
| 2004/0022817 A1 * | 2/2004 | Tardi et al. ..................... 424/400 |
| 2004/0136928 A1 | 7/2004 | Holme |
| 2004/0175489 A1 | 9/2004 | Clark et al. |
| 2005/0019445 A1 | 1/2005 | Wolf et al. |
| 2005/0025721 A1 | 2/2005 | Holme |
| 2005/0112236 A1 | 5/2005 | Boghani |
| 2005/0196503 A1 | 9/2005 | Srivastava |
| 2005/0196517 A1 | 9/2005 | Hodanko et al. |

(56) References Cited

U.S. PATENT DOCUMENTS

| | | |
|---|---|---|
| 2005/0202143 A1 | 9/2005 | Roy et al. |
| 2005/0208084 A1 | 9/2005 | Ley et al. |
| 2005/0210306 A1 | 9/2005 | Rich |
| 2005/0214348 A1 | 9/2005 | Boghani |
| 2005/0220867 A1 | 10/2005 | Boghani |
| 2005/0260266 A1 | 11/2005 | Gebreselassie et al. |
| 2006/0034897 A1 | 2/2006 | Boghani |
| 2006/0068057 A1 | 3/2006 | Boghani et al. |
| 2006/0068059 A1 | 3/2006 | Boghani et al. |
| 2006/0177383 A1 | 8/2006 | Gebreselassie et al. |
| 2006/0251768 A1 | 11/2006 | Bouquerand |
| 2006/0263474 A1 | 11/2006 | Luo |
| 2007/0036733 A1 | 2/2007 | Spence et al. |
| 2007/0048424 A1 | 3/2007 | Moza et al. |
| 2008/0063747 A1 | 3/2008 | Boghani et al. |
| 2008/0160138 A1 | 7/2008 | Boghani et al. |
| 2008/0166449 A1 | 7/2008 | Kabse et al. |
| 2008/0187621 A1 | 8/2008 | Boghani et al. |
| 2008/0199564 A1 | 8/2008 | Boghani et al. |
| 2009/0022846 A1 | 1/2009 | Wittorff et al. |
| 2009/0074911 A1 | 3/2009 | Boghani et al. |
| 2009/0089167 A1 | 4/2009 | Boghani et al. |
| 2009/0098252 A1 | 4/2009 | Boghani et al. |
| 2009/0130250 A1 | 5/2009 | Andersen et al. |
| 2009/0162418 A1 | 6/2009 | Boghani et al. |
| 2009/0175982 A1 | 7/2009 | Boghani et al. |
| 2009/0220642 A1 | 9/2009 | Boghani et al. |
| 2010/0028452 A1 | 2/2010 | Boghani et al. |

FOREIGN PATENT DOCUMENTS

| | | |
|---|---|---|
| EP | 0 067 595 | 12/1982 |
| EP | 0132444 B1 | 2/1985 |
| EP | 0 252 374 | 1/1988 |
| EP | 0 255 260 | 2/1988 |
| EP | 0 273 009 | 6/1988 |
| EP | 0 434 321 | 6/1991 |
| EP | 0 453 397 | 10/1991 |
| GB | 875763 | 8/1961 |
| GB | 1351761 | 1/1972 |
| GB | 1444024 | 7/1996 |
| GB | 2388581 A | 11/2003 |
| JP | 63-245638 | 10/1988 |
| JP | 63-273947 | 10/1988 |
| JP | 20803030 A | 3/1990 |
| JP | 2623769 B2 * | 6/1997 |
| JP | 9/309822 | 12/1997 |
| JP | 10-512862 | 12/1998 |
| WO | 8503414 | 8/1985 |
| WO | 88/00463 | 1/1988 |
| WO | 98/29088 | 7/1988 |
| WO | 89/03170 | 4/1989 |
| WO | 8911212 | 11/1989 |
| WO | 9004926 | 5/1990 |
| WO | 9013994 | 11/1990 |
| WO | 91/07104 | 5/1991 |
| WO | 9202145 | 2/1992 |
| WO | 92/06160 | 4/1992 |
| WO | 9322939 | 11/1993 |
| WO | 9507683 | 3/1995 |
| WO | 9511671 | 5/1995 |
| WO | 95/33034 | 12/1995 |
| WO | 96/19193 | 6/1996 |
| WO | 9617524 | 6/1996 |
| WO | 9620608 | 7/1996 |
| WO | WO 96/22080 | 7/1996 |
| WO | 97/02009 | 1/1997 |
| WO | 97/02011 | 1/1997 |
| WO | 9702273 | 1/1997 |
| WO | 9706695 | 2/1997 |
| WO | 9724036 | 7/1997 |
| WO | 98/03076 | 1/1998 |
| WO | 98/18339 | 5/1998 |
| WO | 98/23165 | 6/1998 |
| WO | 9913870 | 3/1999 |
| WO | 9915032 | 4/1999 |
| WO | 98/27798 | 6/1999 |
| WO | 9922798 | 6/1999 |
| WO | 99/43294 | 9/1999 |
| WO | 9959428 | 11/1999 |
| WO | 99/62354 | 12/1999 |
| WO | 0001253 | 1/2000 |
| WO | 00/35296 | 6/2000 |
| WO | 00/35298 | 6/2000 |
| WO | 00/36924 | 6/2000 |
| WO | 0069282 | 11/2000 |
| WO | 00/75274 | 12/2000 |
| WO | 01/76384 | 10/2001 |
| WO | 0191571 A2 | 12/2001 |
| WO | 02/47489 | 6/2002 |
| WO | 02/055649 | 7/2002 |
| WO | 03020047 | 3/2003 |
| WO | 03063604 A1 | 8/2003 |
| WO | 2004006967 A1 | 1/2004 |
| WO | 2004010998 A1 | 2/2004 |
| WO | WO 2004/010998 | 2/2004 |
| WO | 2004064544 A1 | 8/2004 |
| WO | 2004077956 A2 | 9/2004 |
| WO | 2005016022 A1 | 2/2005 |
| WO | 2005/051427 | 6/2005 |
| WO | 2006079056 A1 | 7/2006 |
| WO | 2006089200 A2 | 8/2006 |

OTHER PUBLICATIONS

Machine Translation of JP 2623769B, Nov. 21, 2009.*
Lubliner, Plasticity Theory, Chapter 2, Macmillan Publishing Company, 1990.*
U.S. Appl. No. 11/913,267, filed Oct. 31, 2007, Boghani, et al.
U.S. Appl. No. 11/302,255, filed Dec. 14, 2005, Boghani, et al.
U.S. Appl. No. 11/134,367, filed May 23, 2005, Boghani, et al.
U.S. Appl. No. 11/134,368, filed May 23, 2005, Boghani, et al.
U.S. Appl. No. 11/134,480, filed May 23, 2005, Boghani, et al.
U.S. Appl. No. 11/134,371, filed May 23, 2005, Boghani, et al.
U.S. Appl. No. 11/134,370, filed May 23, 2005, Boghani, et al.
U.S. Appl. No. 11/134,356, filed May 23, 2005, Boghani, et al.
U.S. Appl. No. 11/134,365, filed May 23, 2005, Boghani, et al.
U.S. Appl. No. 11/134,364, filed May 23, 2005, Boghani, et al.
U.S. Appl. No. 11/134,369, filed May 23, 2005, Boghani, et al.
U.S. Appl. No. 11/769,909, filed Jun. 28, 2007, Boghani, et al.
JP 2083030 A, Publication date: Mar. 23, 1990, Abstract, 1 page.
"CAPROL®3GO CAS No. 9007-48-1" XP002401201. Retrieved from the Internet: URL: http://www.abietccorp.com/documents/3go-17_000.pdf> [retrieved on Sep. 28, 2006].
The State Intellectual Property Office of P.R. China, Application No. 2006800096900, Applicant: Cadbury Adams USA LLC, Title of Invention: Controlled Release Oral Delivery Systems, Notification of the First Office Action, Date: Feb. 5, 2010, 10 pages.
DE19653100 A1, Jul. 23, 1998, Abstract Only, 1 page.
Demmers et al., "Effect of Surfactants and Proteolytic Enzymes on Artificial Calculus Formation", Surfacents and Enzymes, Calculus, Aug. 1867, pp. 28-30.
Emulsifiers With HLB Values, Last Accessed Sep. 27, 2011, pp. 1-3, http://www.theherbarie.com/files/resource-center/formulating/Emulsifiers_HLB_Values.pdf.
European Patent Office, Application No. 06 717 548.9 1221; Ref. MG/P/85286, EP Office Communication dated: May 3, 2010, 4 pages.
ES2080703 A1, Feb. 1, 1996, Abstract Only, 1 page.
GANTREZ® AN; ISP Polymers for Oral Care; Products and Properties, last downloaded from http://www.ispcorp.com/products/oralcare/content/brochure/oral/prod.html on Jun. 9, 2004, 5 pages.
Hercules Incorporated, Technical Information Bulletin VC-566C, 2000, 6 pages.
"HLB Systems" [Online] pp. 1-4, XP002401202. Retrieved from the Internet: URL: http://pharmcal.tripod.com/ch17.htm. [retrieved on Sep. 28, 2006].
JP02227044, Sep. 10, 1990, Abstract Only, 1 page.
JP6079165 A, Mar. 22, 1994, Abstract Only, 1 page.

(56) References Cited

OTHER PUBLICATIONS

JP8308500 A, Nov. 26, 1996, Abstract Only, 1 page.

JP9309822 A, Dec. 2, 1997, Abstract Only, 1 page.

Leffingwell, John C., "Cool without Menthol & Cooler than menthol and Cooling compounds as Insect Repellents" From the Internet: URL: http://www.leffingwell.com/cooler_than_menthol.htm [updated Apr. 5, 2006].

McClements, "Food Emulsions, Principles, Practices, and Techniques", 2005, Contemporary Food Science, 2nd Edition, Title pages and p. 132, 3 pages.

Ottinger et al., "Quantitative Modle Studies on the Efficiency of Precursors in the Formation of Cooling-Active 1-Pyrrolidinyl-2-cyclopenten-1-ones and Bitter-Tasting Cyclopenta-[b]azepin-8(1H)-ones", Journal of Agricultural and Food Chemistry; 2002; pp. 5156-5161.

Ovejero-Lopez et al., "Flavor Release Measurement from Gum Model System", J. Argic. Food Chem. 52, 2004, pp. 8119-8126.

Parikh et al., "Tensile Properties of Free Fillms Cast from Aqueous Ethylcellulose Dispersions", Pharmaceutical Research, vol. 10, No. 6, 1993, pp. 810-815.

Prencipe et al., "Squeezing out a better toothpaste", ChemTech., 1999, 7 pages.

Rassing, "Chewing gum as a drug delivery system", Advanced Drug Delivery Reviews, vol. 13, 1994, pp. 89-121.

R085679 A2, Oct. 31, 1984, Abstract Only, 1 page.

CA2544512 Office Action, dated July 27, 2011, 2 pages.

\* cited by examiner

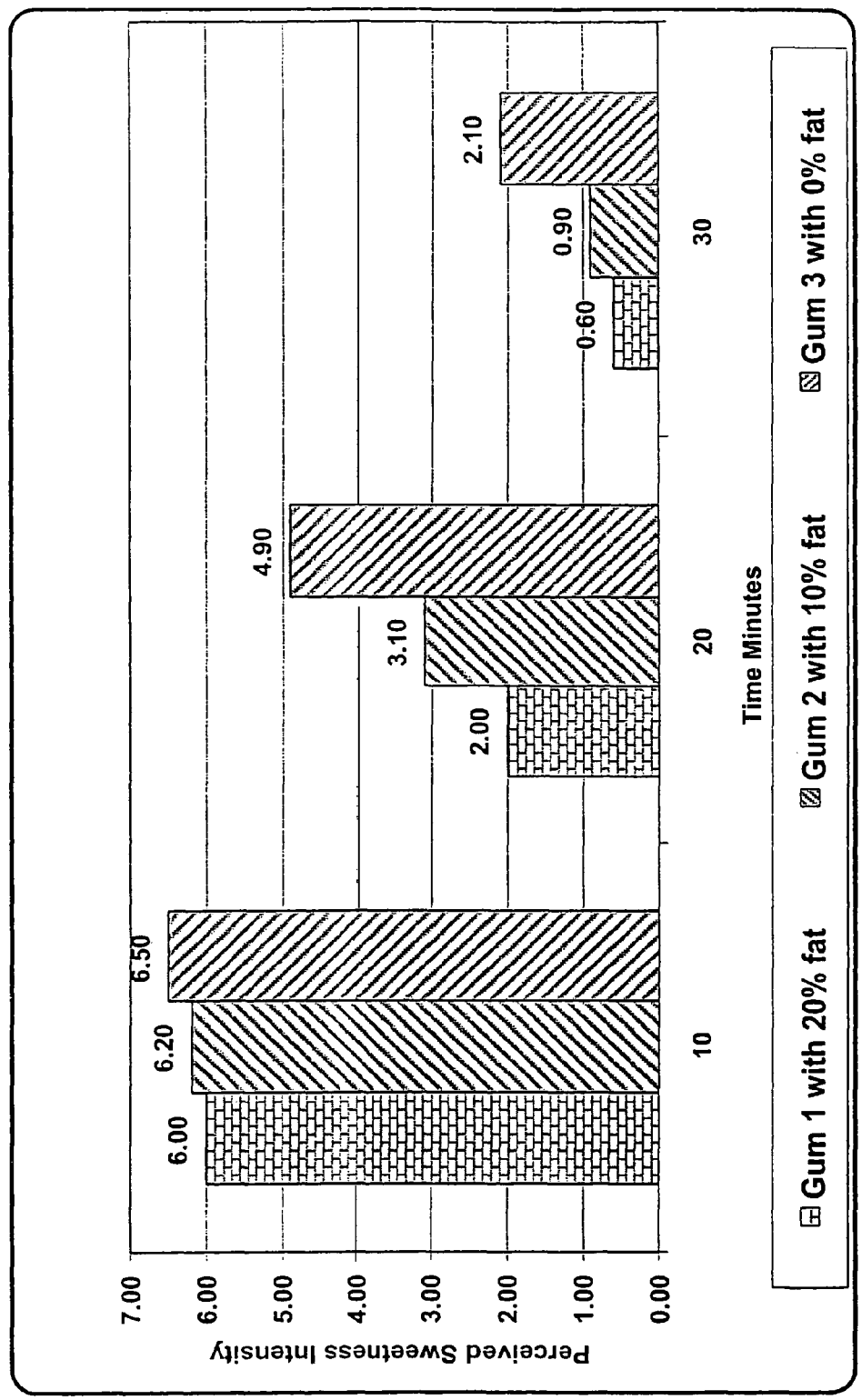
Figure 1: Human Panel sensory results – Sweetness Intensity

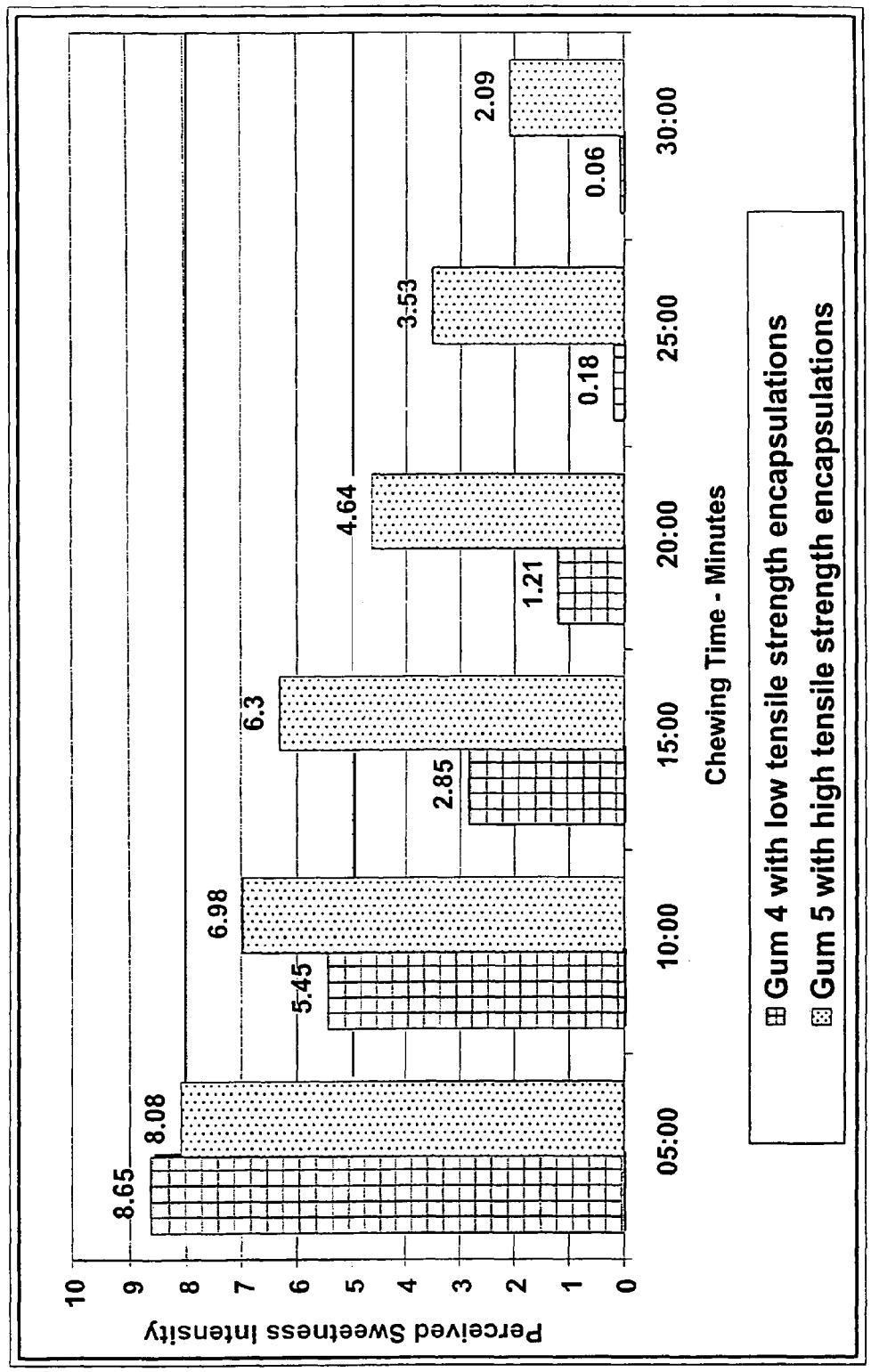
Figure 2: Human Panel sensory results – Sweetness Intensity

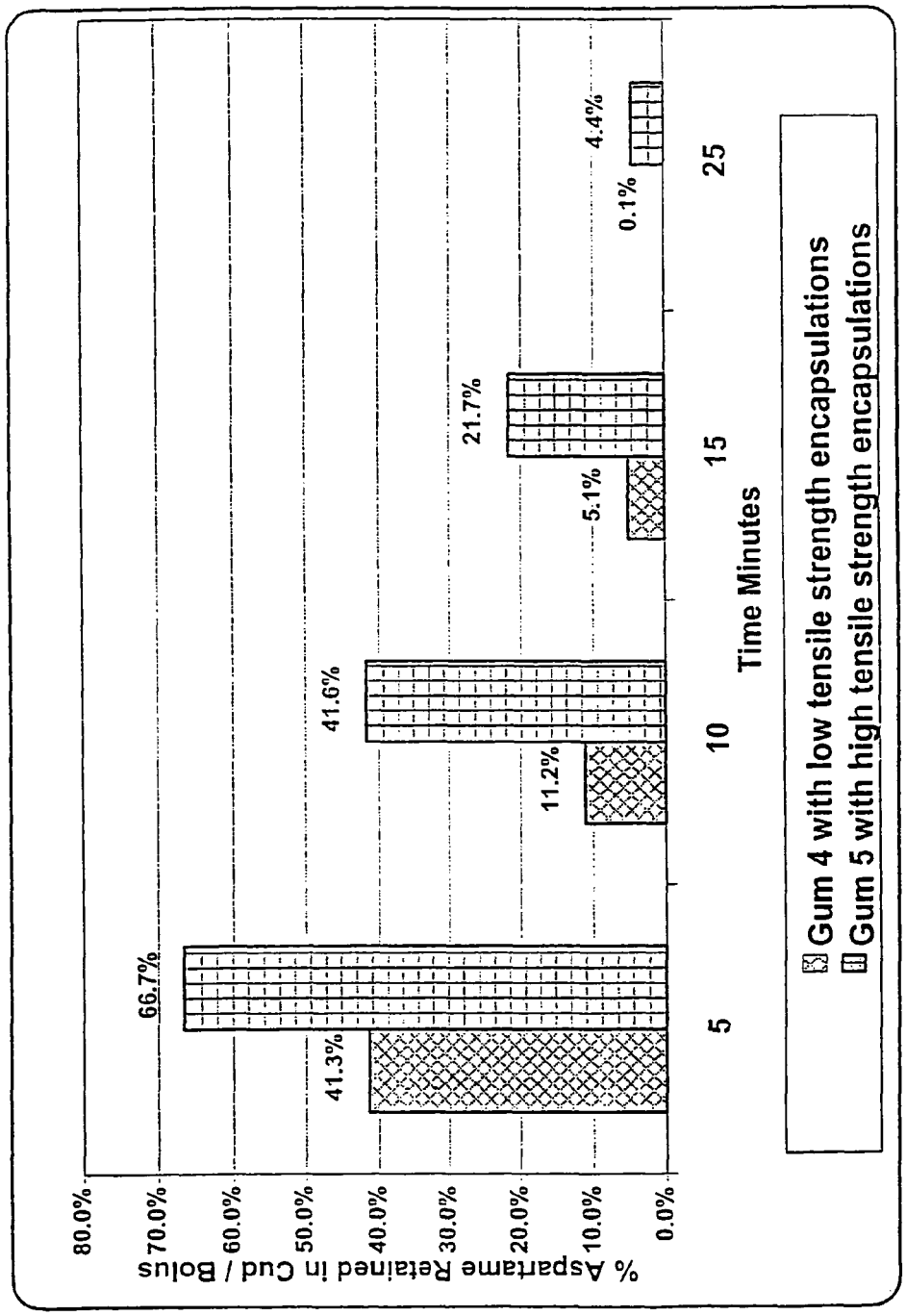
Figure 3: Human chew-out / residual Aspartame in chewed cud

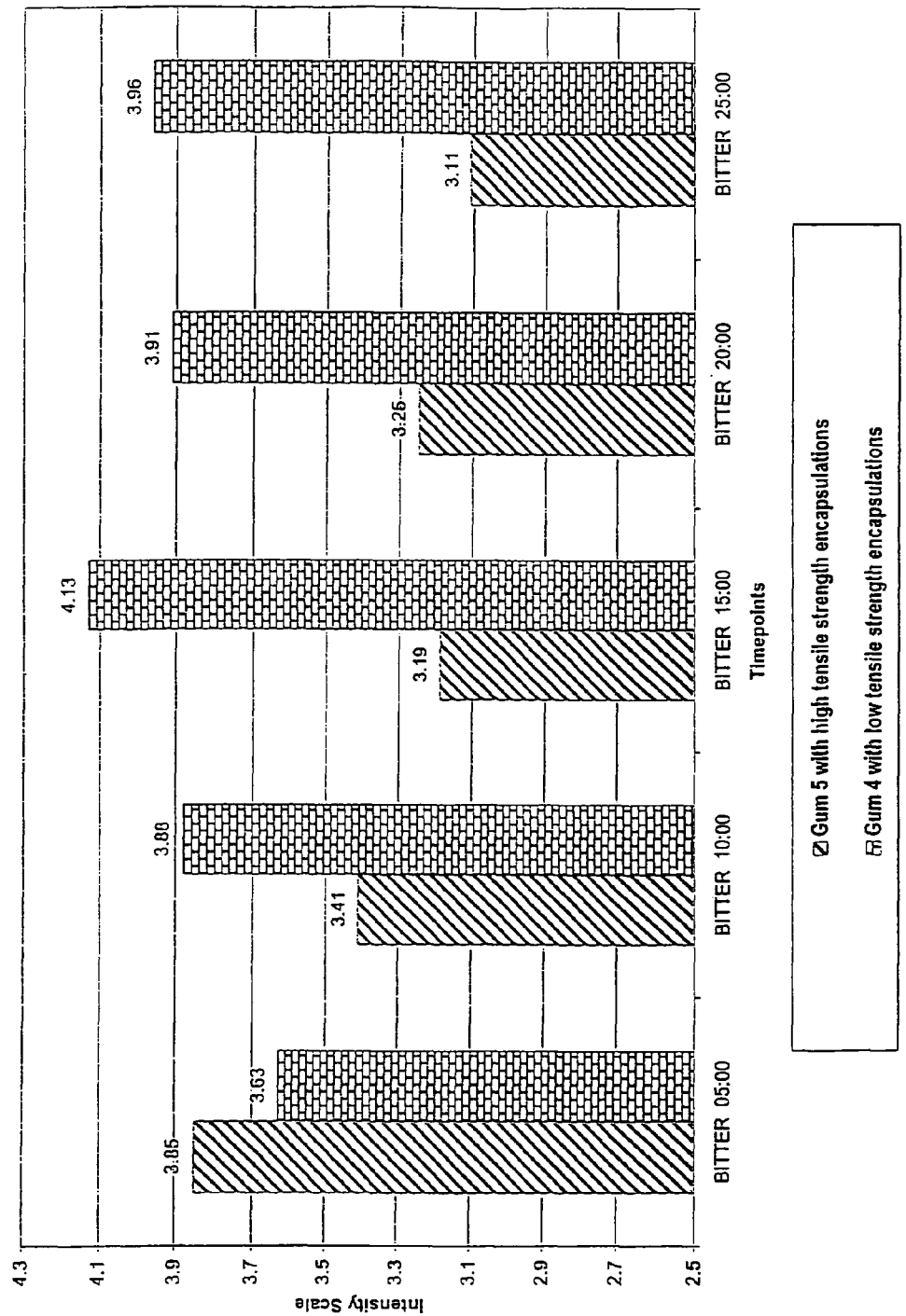
Figure 4: Human Panel Sensory results - Bitterness Intensity

DELIVERY SYSTEM FOR ACTIVE COMPONENTS AS PART OF AN EDIBLE COMPOSITION HAVING PRESELECTED TENSILE STRENGTH

FIELD OF THE INVENTION

The present invention is generally directed to a delivery system for edible compositions in which a desired active component is encapsulated in a manner such that the tensile strength of the delivery system is within a desirable range to provide controlled release of the active component in a consistent manner over an extended period of time.

BACKGROUND OF THE INVENTION

Encapsulating active components in edible compositions to prolong their release and/or to slow their degradation is known. Encapsulating materials used to coat such components include, for example, cellulose, cellulose derivatives, arabinogalactin, gum arabic, polyolefins, waxes, vinyl polymers, gelatin, zein and mixtures thereof. The encapsulating materials have been used to protect active components such as sweeteners, acids, flavorings, soluble dietary fibers, biologically active agents such as pharmaceutical compounds or medicinal drugs, breath freshening agents, and the like.

Attempts have been made to encapsulate active components such as sweeteners, particularly high intensity sweeteners to prevent against premature degradation, to enhance the uniformity of release, and to prolong release in a controlled manner. High intensity sweeteners generally have a sweetening intensity greater than sugar (sucrose) and a caloric value lower than that of sugar at equivalent sweetness levels. It is especially desirable to control the release of high intensity sweeteners in compositions since the high sweetness levels can easily overwhelm the consumer. Moreover, the controlled release of the sweetener provides desirable masking of unpleasant tasting materials. Because each high intensity sweetener is chemically and physically distinct, each is a challenge to use in an edible composition and each exhibits one or more shortcomings, which may be moderated by encapsulation.

For example, many high intensity sweeteners lose their sweetness intensity rapidly when used in edible compositions such as chewing gums and confections. Encapsulation can modulate and prolong release to provide a more desirable taste profile. Some high intensity sweeteners such as saccharin, stevioside, acesulfame-K, glycyrrhizin, and thaumatin have an associated bitter taste or off-note. Certain high intensity sweeteners are also unstable in the presence of certain chemicals including aldehydes and ketones, and sensitive to exposure to environmental conditions including moisture. Solid sucralose is known to turn dark during prolong storage upon exposure to heat and ambient air. Encapsulation can be used to isolate unstable compounds to prevent degradation and prolong shelf life.

Typically, the taste profile of a high intensity sweetener can be described as a rapid burst of sweetness. Usually, high intensity sweeteners reach their peak sweet taste rapidly, with the intensity of sweet taste rapidly declining soon thereafter. The initial rapid burst can be unpleasant to many consumers as the strong sweet taste tends to overpower the other flavors that may be present in the edible composition. The relatively rapid loss of sweetness can also result in a bitter aftertaste. For this reason, it is typically desirable to encapsulate high intensity sweeteners with an encapsulating material in order to modulate and prolong the release rate and to chemically stabilize and enhance the overall taste profile. The selection of a suitable encapsulating material (i.e., polyvinyl acetate) has usually been focused on the molecular weight of the encapsulating material with higher molecular weights generally associated with longer release times.

By way of example, U.S. Pat. No. 4,711,784 to Yang discloses a chewing gum composition containing a high molecular weight polyvinyl acetate blended with a hydrophobic plasticizer as an encapsulating material. The encapsulating material is used to encapsulate an active ingredient such as aspartame.

U.S. Pat. No. 4,816,265 to Cherukuri et al. discloses a sweetener delivery system, which uses a coating composed of an emulsifier and a polyvinyl acetate encapsulating material having a molecular weight of from about 2,000 to 14,000, optionally in the presence of a wax. The coating is applied to sweeteners such as aspartame to effectuate sustained release of the sweetener.

U.S. Pat. No. 5,057,328 to Cherukuri et al. discloses a food acid delivery system for use in for example, chewing gums, having a food acid that is encapsulated in a matrix comprising an emulsifier and polyvinyl acetate in a specified molecular weight range.

U.S. Pat. No. 5,108,763 to Chau et al. discloses a sweetening agent delivery system having prolonged sweetener release. The system utilizes a high intensity sweetener encapsulated in polyvinyl acetate having a molecular weight in the range of from about 2,000 to 100,000. The system further includes the use of a plasticizing agent, a waxy material and an emulsifying agent.

U.S. Pat. No. 5,789,002 to Duggan et al. discloses a process for preparing sweeteners and acids as ingredients for chewing gum compositions. In particular, the Duggan et al. reference discloses encapsulating the sweetener or acid in a delivery system such as polyvinyl acetate.

U.S. patent application Ser. No. 2002/0122842 filed by Seiestad et al. discloses food mixtures including chewing gums containing at least two acids encapsulated by a polyvinyl acetate matrix. The polyvinyl acetate has a molecular weight in the range of from about 20,000 to 120,000.

The prior art systems identified above prepare encapsulating materials by taking into account the selection of an encapsulating material (e.g. polyvinyl acetate) and its molecular weight.

Since polyvinyl acetate is the most common encapsulating material, the molecular weight of the material becomes a critical feature in the making of prior art delivery systems. Thus, the state of the art for encapsulating active components especially high intensity sweeteners essentially associates controlled release of the active component with the molecular weight of the encapsulating material. However, this approach is limited in that the predictable modification of the controlled release of the active agent is made only through the modification of the molecular weight of the encapsulating material. There is no predictable modification based on the use of other encapsulating materials and/or additives that may be employed in the preparation of suitable delivery systems. Thus, there is no comprehensive approach to the production of a desirable delivery system that can provide a desirable release rate of an active component without engaging in a significant amount of trial and error experimentation.

It would therefore be a significant advance in the art to provide a process of producing delivery systems for the desirable release of an active component so that regardless of the type of the composition of the delivery system it will be suitable for the particular application (e.g., the controlled delivery of a high intensity sweetener).

SUMMARY OF THE INVENTION

The present invention provides a new approach to the controlled release of an active component in edible compositions such as, for example, chewing gum and confectionery compositions. The active component(s) and materials used to encapsulate the same provide a delivery system(s) that enables exceptional control of the release of the active component over a wide range of delivery systems and takes into account the use of a range of encapsulating materials and additives that may be used to formulate the delivery system. The delivery system is formulated based on tensile strength as the prime factor in formulating a delivery system that can deliver a designated active component at a desirable release rate. The encapsulated active components are preserved until release is desirable and therefore protected against moisture, reactive compounds, pH changes and the like. When the active component is a sweetener, the delivery system is tailored to the sweetener to provide consistent sustained release, thus extending the time the sweetener is released to provide an edible composition which provides a long lasting desirable taste profile, increased salivation and overall enjoyment of the taste imparted therefrom without the disadvantage of prior art systems in which the sweetener may be released at less or more than a desirable rate.

The present invention is premised on the discovery that the tensile strength of the delivery system provides a desired controlled, extended release of an active component. As a result, a delivery system can be readily and easily formulated using a broad range of materials (e.g., encapsulating agents, active components, additives) with the desired characteristics to achieve a particular desirable release rate. The active components and materials used to encapsulate the same provide a delivery system that provides exceptional control of the release of the active component.

It has been found in accordance with the present invention that a delivery system for active components can be provided based on the tensile strength of the delivery system having a specific tensile strength when compared to a standard. This approach differs from those prior art systems that focus on one characteristic (molecular weight) of one of the materials (encapsulating material) used to produce the delivery system. In this manner, a delivery system is formulated to express a desired release profile by adjusting and modifying the tensile strength through the specific selection of the active component, the encapsulating material, the additives, the amount of the active component and the like which can be compared to at least one, typically a plurality of standard delivery systems each having a known release rate. Once a desired tensile strength is chosen, any delivery system which has the desired tensile strength may be used without being limited to a particular encapsulating material and its molecular weight. The formulation process can be extended to encapsulating materials which exhibit similar physical and chemical properties as the encapsulating material forming part of the standard delivery system.

As used herein, the term "tensile strength" means the maximum stress a material subjected to a stretching load can withstand without tearing. A standard method for measuring tensile strength of a given substance is defined by the American Society of Testing Materials in method number ASTM-D638.

In accordance with the present invention, the selection of a desired tensile strength within a desirable range enables the production of edible compositions using a range of materials including encapsulating materials without having to focus on a particular encapsulating material and without being limited to modifying the release rate solely through the selection of a molecular weight for the encapsulating material.

BRIEF DESCRIPTION OF THE DRAWINGS

The following drawings are illustrative of embodiments of the present invention and are not intended to limit the invention as encompassed by the claims forming part of the application.

FIG. 1 is a graph comparing perceived sweetness intensity of three samples of gum over a 30 minute period in accordance with the present invention;

FIG. 2 is a graph comparing perceived sweetness intensity of two samples of gum each containing different tensile strength delivery systems over a 30 minute period in accordance with the present invention;

FIG. 3 is a graph comparing the percentage of aspartame retained over a period of time for two samples of gum containing different tensile strength delivery systems in accordance with the present invention; and FIG. 4 is a graph comparing perceived bitterness intensity of two gum samples each containing different tensile strength delivery systems in accordance with the present invention.

DETAILED DESCRIPTION

In one aspect of the present invention, there is provided a delivery system for inclusion in an edible composition such as a chewing gum composition or confectionery composition having at least one active component encapsulated by an encapsulating material wherein the delivery system has a tensile strength of at least 6,500 psi, and typically ranging from about 6,500 psi to 200,000 psi.

In a further aspect of the present invention there is provided an edible composition such as a chewing gum composition or a confectionery composition comprising at least one edible composition-forming component and a delivery system comprising at least one active component encapsulated within an encapsulating material, the delivery system having a tensile strength of at least 6,500 psi.

In a still further aspect of the invention there is provided a method of preparing a target delivery system for an edible composition comprising combining at least one active component, at least one encapsulating material, and optionally at least one additive until a preselected tensile strength of the target delivery system is obtained based on comparison with the tensile strength of at least one sample delivery system having the same or similar active component and a known release rate of the active component.

There is also provided a method of preparing a target delivery system for an edible composition useful for delivering at least one active component at a desired release rate, said method comprising the step of encapsulating the at least one active component in an encapsulating material in a manner that provides the target delivery system with a tensile strength of at least 6,500 psi.

Still further there is provided a method of preparing a target delivery system for an edible composition useful for delivering at least one active component at a desired release rate, said method comprising encapsulating the at least one active component in an encapsulating material in a manner that provides the target delivery system with a target tensile strength associated with the desired release rate, enabling the delivery system to release the at least one active component form the edible composition at the desired release rate.

In addition, there is provided a method of preparing an edible composition containing a target delivery system useful for delivering at least one active component at a desired release rate, said method comprising encapsulating the at least one active component in an encapsulating material in a manner that provides the target delivery system with a target tensile strength associated with the desired release rate enabling the delivery system to release the at least one active component from the edible composition at desired release rate, and adding the target delivery system to the edible composition.

There is also provided edible compositions containing the present delivery system. Although the one embodiment of the present invention relates to chewing gum compositions, confectionery compositions and beverages, the present invention can be utilized to produce a variety of edible compositions including, but not limited to, food products, foodstuffs, nutrient-containing compositions, pharmaceuticals, nutraceuticals, vitamins and other products that may be prepared for consumption by the consumer. Because the delivery system may be readily incorporated into an edible composition, the edible compositions which may benefit from and are encompassed by the present invention are wide ranging as indicated above.

The term "delivery system" as used herein is meant to encompass the encapsulating material and a single active component encapsulated therein as well as other additives used to form the delivery system as hereinafter described. It will be understood that the edible compositions of the present invention may contain a plurality of delivery systems with each delivery system containing a single active component.

The term "encapsulating material" is meant to encompass any one or more edible water insoluble materials capable of forming a solid coating or film as a protective barrier around the active component.

The present invention is directed generally to a delivery system as defined herein for use in edible compositions, which comprises an encapsulating material and an active component encapsulated by the encapsulating material. The delivery system of the present invention is formulated with a predetermined tensile strength sufficient to provide consistent controlled release of the active component over a preselected period of time such as an extended period of time. This period of time will vary depending on the type of product in which the delivery system is incorporated. One of skill in the art, based on the disclosure herein can adjust the delivery system to achieve the desired effect. An extended period of time as used herein, relates to an increased release of the active ingredient from the delivery system for over a greater period of time than previously described systems and can be at least 15 minutes, including at least 20 minutes, at least 25 minutes, at least 30 minutes, as well as all values and ranges therebetween, for example, about 25 to 30 minutes or more. Furthermore, the delivery system of the present invention also provides a way to not only deliver active agents over a prolonged period of time but also maintain an increased intensity of the active ingredient over the extended period of time. For example, if the active ingredient is a flavor or sweetener. In one aspect of the invention, the amount of active agent released can vary during the extended period of time. For example, at an early stage of delivery the amount of active component released (based on the total amount present in the delivery system at that time) can be greater than the amount of active component released during subsequent or later periods (based on the total amount present in the delivery system at that time).

In one embodiment, the extended period of time results in retaining at least about 5% of the at least one active component after 30 minutes from the start of delivering the active component in the edible composition, such as the start of chewing a chewing gum composition, including at least about 10%, 15%, 20%, 25%, 30%, or more after 30 minutes. In another embodiment, the extended period of time results in retaining at least about 10% of the at least one active component after 20 minutes from the start of delivering the active component, including at least about 15%, 20%, 25%, 30%, 40%, 50% or more after 20 minutes. In another embodiment, the extended period of time results in retaining at least about 30% of the at least one active component after 15 minutes from the start of delivering the active component, including at least about 30%, 40%, 50%, 60%, 70%, 75% or more after 15 minutes.

In another embodiment, using sweetener in chewing gum as an example, the extended period of time results in a perceived sweetness intensity during at least the entire period of time noted above, e.g., at least about 15 minutes, at least about 20 minutes, at least about 30 minutes, etcetera from the start of chewing the chewing gum composition.

The predetermined tensile strength is determined based, in part, on the active component and the desired release time of the same. The predetermined tensile strength may be selected from a standard comprised of one or more delivery systems with each standard delivery system having a known release rate of the desired active component. The delivery system of the present invention further provides the active component with a protective barrier against moisture and other conditions such as pH changes, reactive compounds and the like, the presence of which can undesirably degrade the active component.

The delivery system facilitates the controlled release of the active component in a wide variety of edible compositions including chewing gum compositions, food products, confectionery compositions, pharmaceutical compositions, beverages, foodstuffs, nutrient-containing compositions, vitamins, nutraceuticals and the like.

The delivery system is developed in accordance with the present invention to have a desirable tensile strength which may be selected, depending in part on the active component and the release rate of the active component desired, from a standard of known delivery systems containing the active component at known release rates. The active components which may be incorporated as part of the delivery system may be selected from sweeteners including high intensity sweeteners, acids, flavorants, pharmaceuticals, therapeutic agents, vitamins, breath fresheners, cooling agents and other materials that would benefit by coating for protection, controlled release and/or for taste masking. The active components include nicotine useful for the treatment of addiction to tobacco products and caffeine typically found in coffee and/or cola beverages. In a particularly one form of the present invention, the active component is a sweetener, for example a high intensity sweetener such as neotame and aspartame.

It has been found in accordance with the present invention that a delivery system for delivering an active component can be formulated to ensure an effective sustained release of the active component based on the type and amount of the active component and desired release rate. For example, it may be desirable to effect the controlled release of a high intensity sweetener over a period of 25 to 30 minutes to ensure against a rapid burst of sweetness which may be offensive to some consumers. A shorter controlled release time may be desirable for other type of active components such as pharmaceuticals or therapeutic agents, which may be incorporated into the same edible composition by using separate delivery systems for each active component. In accordance with the present invention, delivery systems may be formulated with a particular tensile strength associated with a range of release rates based on a standard. The standard may comprise a series of known delivery systems having tensile strengths over a range extending, for example, from low to high tensile strength values. Each of the delivery systems of the standard will be associated with a particular release rate or ranges of release rates. Thus, for example, a delivery system can be formulated with a relatively slow release rate by a fabricating a delivering system having a relatively high tensile strength. Conversely, lower tensile strength compositions tend to exhibit relatively fast release rates. One factor of the present invention is that the tensile strength of the delivery system is directly associated with the release rate of the active component without direct regard for the type or molecular weight of the encapsulating material.

In one embodiment, the present invention includes the incorporation of a plurality of delivery systems to deliver a plurality of separate active components including active components which may be desirably released at distinctly different release rates.

For example, high intensity sweeteners may desirably be released over an extended period of time (e.g. 20 to 30 minutes) while some pharmaceuticals are desirably released over a significantly shorter period of time.

In certain embodiments of the present invention, the delivery system can be prepared such that the release of the at least one active agent is at specific rates relative to the time of delivery. For example, in one embodiment, the delivery system can be prepared such that the release of the at least one active agent is released at a rate of 80% over the course of 15 minutes, 90% over the course of 20 minutes, and/or a 95% over the course of 30 minutes. In another embodiment, the delivery system can be prepared such that the one or more active agents are released at a rate of 25% over the course of 15 minutes, 50% over the course of 20 minutes and/or 75% over the course of 30 minutes.

In a one embodiment of the present invention, there is provided a method of selecting a target delivery system containing an active component for an edible composition. The method generally includes preparing a targeted delivery system containing an active component, an encapsulating material and optional additives, with the targeted delivery system having a pre-selected tensile strength. The tensile strength of the targeted delivery system is pre-selected to provide a desirable release rate of the active component. This selection of the tensile strength is based on the tensile strengths of sample delivery systems having the same or similar active component and known release rates of the active component. In a another embodiment of the invention, the method comprises the steps of (a) obtaining a plurality of sample delivery systems comprising an active component, at least one encapsulating material, and optional additives, wherein each of the delivery systems has a different tensile strength; (b) testing the sample delivery systems to determine the respective release rates of the active component; and (c) formulating a target delivery system containing the same active component with a tensile strength corresponding to a desired release rate of the active component based on the obtained sample delivery systems.

It will be understood that a plurality of delivery systems may be prepared in this manner each containing a different active component by utilizing a comparison with standard delivery systems containing such different active components.

The method of selecting at least one delivery system suitable for incorporation into an edible composition can begin by determining a desired release rate for an active component (i.e. a first active component). The determination of the desired release rate may be from known literature or technical references or by in vitro or in vivo testing. Once the desired release rate is determined, it is typical to determine the desired tensile strength (i.e. first tensile strength) for a delivery system (i.e. first delivery system) that can release the first active component at the desired release. Once the delivery system is obtained which can deliver the active component as required it is then selected for eventual inclusion in an edible composition.

The method described above may then be repeated for a second active component and for additional active components as described via the determination and selection of a suitable delivery system.

The present method can be used in connection with formulating the target delivery system using encapsulating materials having similar physical and chemical properties including the degree of water solubility, affinity for the active component, and the like as those used in the sample delivery systems.

Applicants have discovered that by maintaining the tensile strength of the delivery system within a preselected desirable range, the active component is released from the composition in a highly controlled and consistent manner irrespective of the particular type of encapsulating materials employed. By focusing on the tensile strength of the delivery system, the process for selecting and formulating suitable delivery systems is enhanced in a manner which effectively reduces the need for trial and error experimentation typically necessary in prior art systems. The present invention, for example, enables the formulation of a suitable target delivery system by focusing on a single variable (i.e., tensile strength) and therefore takes into account all components of the delivery system including encapsulating materials and any additives (e.g., fats and oils) that may be desirably added to the formulation and enables the delivery system when added to an edible composition to release the active component at a desirable release rate.

The desired tensile strength of the delivery system can be readily determined within a desired range. In one embodiment of the present invention, the tensile strength of the delivery system is at least 6,500 psi, including 7500, 10,000, 20,000, 30,000, 40,000, 50,000, 60,000, 70,000, 80,000, 90,000, 100,000, 125,000, 135,000, 150,000, 165,000, 175,000, 180,000, 195,000, 200,000 and all ranges and subranges there between, for example a tensile strength range of 6,500 to 200,000 psi. The formulation of a delivery system with a desirable tensile strength can be made from a variety of encapsulating materials and at least one additive which hereinafter are referred to as "at least one tensile strength modifying agent or modifier." The at least one additive may be used to formulate the delivery system by modifying the tensile strength of the delivery system, including tensile strength-lowering materials such as fats, emulsifiers, plasticizers (softeners), waxes, low molecular weight polymers, and the like, in addition to tensile strength increasing materials such as high molecular weight polymers. In addition, the tensile strength of the delivery system can also be fine tuned by combining different tensile strength modifiers to form the delivery system. For example, the tensile strength of high molecular weight polymers such as polyvinyl acetate may be reduced when tensile strength lowering agents such as fats and/or oils are added.

In one embodiment of the present invention, at least one tensile strength modifying agent is present in the delivery system in an amount sufficient such that the release of the one or more active agents contained in the delivery system is released at a rate of 80% over the course of 15 minutes, 90% over the course of 20 minutes, and/or a 95% over the course of 30 minutes. In another embodiment, the at least one tensile strength modifying agent is present in the delivery system in an amount sufficient such that the one or more active agents are released at a rate of 25% over the course of 15 minutes, 50% over the course of 20 minutes and/or 75% over the course of 30 minutes.

In another embodiment of the present invention, the at least one tensile strength modifying agent is present in the delivery system in an amount sufficient such that the tensile strength of the delivery system is at least about 6,500 psi, including 7500, 10,000, 20,000, 30,000, 40,000, 50,000, 60,000, 70,000, 80,000, 90,000, 100,000, 125,000, 135,000, 150,000, 165,000, 175,000, 180,000, 195,000, 200,000 and all ranges and subranges there between, for example a tensile strength range of 6,500 to 200,000 psi.

Examples of tensile strength modifiers or modifying agents include, but are not limited to, fats (e.g., hydrogenated or non-hydrogenated vegetable oils, animal fats), waxes (e.g., microcrystalline wax, bees wax), plasticizers/emulsifiers (e.g., mineral oil, fatty acids, mono- and diglycerides, triacetin, glycerin, acetylated monoglycerides, glycerol rosin monostearate esters), low and high molecular weight polymers (e.g., polypropylene glycol, polyethylene glycol, polyisobutylene, polyethylene, polyvinylacetate) and the like, and combinations thereof. Plasticizers may also be referred to as softeners.

Thus, by employing tensile strength modifiers, the overall tensile strength of the delivery system can be adjusted or altered in such a way that a preselected tensile strength is obtained for the corresponding desired release rate of the active component from an edible composition based on a comparison with a standard.

The delivery system of the present invention is typically in the form of a powder or granules. The particle size, generally, can vary and not have a significant effect on the function of the present invention. In one embodiment the average particle size is desirably selected according to the desired rate of release and/or mouthfeel (i.e., grittiness) and the type of carrier incorporated in the edible composition. Thus, in certain embodiments of the present invention, the average particle size is from about 75 to about 600, including 100, 110, 140, 170, 200, 230, 260, 290, 320, 350, 370 and all values and ranges there between. As the values are an average one will appreciate within a given sample of powder or granules, there may be particles with sizes greater and/or less than the numerical values provided. In one embodiment of the invention, where the delivery system is incorporated into a chewing gum the particle size can be less than 600 microns.

Except as otherwise noted, the amount of the ingredients incorporated into the compositions according to the present invention is designated as % by weight based on the total weight of the composition.

The delivery systems of the present invention produce controlled release of the active components as desired through the use of a preselected tensile strength when matched with a desirable release rate selected according to the type of the active components to be encapsulated, the encapsulating material used, the additives incorporated, the desired rate of release of the active component, and the like. The materials used to encapsulate the active component are generally selected from edible water insoluble materials capable of forming a strong matrix, solid coating or film as a protective barrier around the active component. The encapsulating material is chosen in a manner consistent with the tensile strength of the delivery system which can be at least 6,500 psi, including 7500, 10,000, 20,000, 30,000, 40,000, 50,000, 60,000, 70,000, 80,000, 90,000, 100,000, 125,000, 135,000, 150,000, 165,000, 175,000, 180,000, 195,000, 200,000 and all ranges and subranges there between, for example a tensile strength of 6,500 to 200,000 psi. Such encapsulating materials may be selected from polyvinyl acetate, polyethylene, crosslinked polyvinyl pyrrolidone, polymethylmethacrylate, polylactidacid, polyhydroxyalkanoates, ethylcellulose, polyvinyl acetatephthalate, polyethylene glycol esters, methacrylicacid-co-methylmethacrylate, and the like, and combinations thereof.

The encapsulating material may be present in amounts of from about 0.2% to 10% by weight based on the total weight of the edible composition, including 0.3, 0.5, 0.7, 0.9, 1.0, 1.25, 1.4, 1.7, 1.9, 2.2, 2.45, 2.75, 3.0, 3.5, 4.0, 4.25, 4.8, 5.0, 5.5, 6.0, 6.5, 7.0, 7.25, 7.75, 8.0, 8.3, 8.7, 9.0, 9.25, 9.5, 9.8 and all values and ranges there between, for example, from 1% to 5% by weight. The amount of the encapsulating material will, of course, depend in part on the amount of the active component which must be encapsulated. The amount of the encapsulating material with respect to the weight of the delivery system, is from about 30% to 99%, including 35, 40, 45, 50, 55, 60, 65, 70, 75, 80, 85, 95, 97 and all values and ranges there between, for example, from about 60% to 90% by weight.

The tensile strength of the delivery system may be selected from relatively high tensile strengths when a relatively slow rate of release is desired and relatively lower tensile strengths when a faster rate of release is desired. Thus, when employing a tensile strength of 50,000 for a delivery system, the release rate of the active component, will generally be lower than the release rate of the active component in a delivery system having a tensile strength of 10,000 psi regardless of the type of encapsulating material (e.g. polyvinyl acetate) chosen.

In a one embodiment of the present invention, the encapsulating material is polyvinyl acetate. A representative example of a polyvinyl acetate product suitable for use as an encapsulating material in the present invention is Vinnapas® B100 sold by Wacker Polymer Systems of Adrian, Mich. A delivery system utilizing polyvinyl acetate may be prepared by melting a sufficient amount of polyvinyl acetate at a temperature of about 65° to 120° C. for a short period of time, e.g., 5 minutes. The melt temperature will depend on the type and tensile strength of the polyvinyl acetate encapsulating material where higher tensile strength materials will generally melt at higher temperatures. Once the encapsulating material is melted, a suitable amount of the active component (e.g., high intensity sweetener such as aspartame) is added and blended into the molten mass thoroughly for an additional short period of mixing. The resulting mixture is a semi-solid mass, which is then cooled (e.g., at 0° C.) to obtain a solid, and then ground to a U.S. Standard sieve size of from about 30 to 200 (600 to 75 microns). The tensile strength of the resulting delivery system can readily be tested according to ASTM-D638.

The selection of a suitable encapsulating material will also depend in part on the type and amount of the active component and the presence of other additives or ingredients. Plasticizers or softeners as well as fats and oils, for example, act as "tensile strength modifying agents" and may be incorporated into the delivery system and particularly into the encapsulating material to modify the tensile strength of the resulting delivery system. The above mentioned additives may be added to the encapsulating material during the molten state. The amount of additives used in the delivery system of the present invention will of course vary according to the desired tensile strength but will typically range up to 40% by weight based on the total weight of the delivery system.

In formulating the delivery system to have a predetermined tensile strength, the active component can be entirely encapsulated within the encapsulating material or incompletely encapsulated within the encapsulating material provided the resulting tensile strength of the delivery system meets the criteria set forth hereinabove. The incomplete encapsulation can be accomplished by modifying and/or adjusting the manufacturing process to get partial coverage of the active component.

The presence of fats and oils as an additive has been found to have two effects on the delivery system. The first effect is observed at lower concentrations, i.e. up to 5% by weight, including up to 4.7, up to 4.5, up to 4.25, up to 4.0, up to 3.5, up to 3.0, up to 2.5, up to 2.25, up to 2.0, up to 1.75, up to 1.5, up to 1.0 and all values and ranges therebetween, wherein the fats and/or oils either maintain or increase the tensile strength of the delivery system. At higher concentrations (i.e., typically above 5% by weight), the fats and/or oils tend to reduce the tensile strength of the delivery system. Even with such unusual or non-linear effects on the tensile strength of the delivery system, a suitable delivery system with the desired release of the active component may be readily formulated in accordance with the present invention because the targeted delivery system is prepared based on sample delivery systems having known release rates for the active component.

Although the present description made herein relates to sweeteners, it will be understood that the effect of tensile strength on the delivery system will be similar regardless of the active component.

The sweetening agents used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, acesulfame salts, such as the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, neotame, and mixtures thereof;

(d) water-soluble sweeteners derived from naturally occurring water-soluble sweeteners, such as stevosides, chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galacto-pyranosyl-1,6-dichloro-1,6-dideox y-beta-D-fructofuranoside, or 4,6,1',6'-tetrachloro4,6,1',6'-tetradeoxygalacto-sucrose; and 4,6,1',6'-tetradeoxy-sucrose, and mixtures thereof; and (e) protein based sweeteners such as thaumaoccous danielli (Thaumatin I and II), talin.

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof. In one embodiment, the sweetener is a high intensity sweetener such as aspartame, sucralose, and acesulfame potassium (Ace-K).

The active component (e.g., sweetener), which is part of the delivery system, may be used in amounts necessary to impart the desired effect associated with use of the active component (e.g., sweetness). With respect to their presence in the delivery system, the active components may be present in amounts of from about 1% to 70% by weight based on the total weight of the delivery system, including 5, 10, 15, 20, 25, 30, 35, 40, 45, 50, 55, 60, 65% by weight, and all values and ranges there between, for example, from about 10% to 40% by weight based on the total weight of the delivery system. For typical edible compositions including chewing gum compositions, confectionery compositions and beverage compositions, the sweeteners may be present in amounts of from about 0.1% to 6% by weight based on the total weight of the edible composition, including 0.5, 1, 2, 3, 4, 5% by weight and all values and subranges there between, for example, 0.5% to 3% by weight. The active component especially when the active component is a sweetener may also be present in the edible composition in free form depending on the release profile desired.

In another aspect of the present invention, there is provided edible compositions which comprise the present delivery system and a carrier in an amount appropriate to accommodate the delivery system. The term "carrier" as used herein refers to an orally acceptable vehicle such as the soluble and insoluble components of a chewing gum composition capable of being mixed with the delivery system, and which will not cause harm to warm-blooded animals including humans. The carriers further include those components of the composition that are capable of being commingled without significant interaction with the delivery system.

In a one embodiment of the present invention, the edible composition is a chewing gum composition having prolonged release (e.g., typically at least 15 minutes) of the active component. The chewing gum composition comprises a chewing gum base and the delivery system of the present invention that comprises an encapsulating material and at least one encapsulated active component such as, for example, a sweetener or a flavorant. The delivery system is present in amounts from about 0.2% to 10% by weight based on the total weight of the chewing gum composition, including 0.5, 1.0, 2.0, 3.0, 4.0, 5.0, 6.0, 7.0, 8.0, 9.0% by weight including all values and subranges there between, for example, from about 1% to 5% by weight.

The present invention may be incorporated with a variety of processes for preparing chewing gum compositions as known in the art. Such chewing gum compositions may be and include a variety of different formulations that are typically used to make chewing gum products. Typically, a chewing gum composition contains a chewable gum base portion, which is essentially free of water and is water insoluble and a water soluble bulk portion.

The water soluble portion is generally released from the gum base portion over a period of time during chewing. The gum base portion is retained in the mouth throughout the chewing. The water insoluble gum base generally comprises elastomers, elastomer solvents, plasticizers, waxes, emulsifiers, and inorganic fillers. Plastic polymers such as polyvinyl acetate, which behave somewhat as plasticizers, are also included. Other plastic polymers that may be used include polyvinyl laurate, crosslinked polyvinyl pyrrolidone and polyhydroxy alkanoates.

The elastomers may constitute from about 5% to 95% by weight of the gum base. In another embodiment, the elastomers may constitute from about 10% to 70% by weight of the gum base and in another embodiment, 15% to 45% by weight of the gum base. Examples of elastomers include synthetic elastomers such as polyisobutylene, polybutylene, isobutylene-isoprene co-polymers, styrene-butadiene co-polymers, polyvinyl acetate and the like. Elastomers may also include natural elastomers such as natural rubber as well as natural gums such as jelutong, lechi caspi, perillo, massaranduba balata, chicle, gutta hang kang or combinations thereof. Other elastomers are known to those of ordinary skill in the art.

Elastomer plasticizers modify the finished gum firmness when used in the gum base. Elastomer plasticizers are typically present in an amount up to 75% by weight of the gum base. In another embodiment, the elastomer plasticizers are present in an amount of from about 5% to 45% by weight of the gum base and in another embodiment from about 10% to 30% by weight of gum base. Examples of elastomer plasticizers include natural rosin esters such as glycerol ester of partially hydrogenated rosin, glycerol ester of tall oil rosin, pentaerythritol esters of partially hydrogenated rosin, methyl and partially hydrogenated methyl esters of rosin, and the like. Synthetic elastomer plasticizers such as terpene resins may also be employed in gum base composition.

Waxes include synthetic and naturally occurring waxes such as polyethylene, beeswax, carnauba and the like. Petroleum waxes such a paraffin may also be used. The waxes may be present in the amount up to 30% by weight of the gum base. Waxes aid in the curing of the finished gum and help improve the release of flavor and may further extend the shelf life of the product.

Elastomer solvents are often resins such as terpene resins. Plasticizers, sometimes referred to as softeners, are typically fats and oils, including tallow, hydrogenated vegetable oils, and cocoa butter.

Gum base typically also includes a filler component. The filler component modifies the texture of the gum base and aid processing. Examples of such fillers include magnesium and aluminum silicates, clay, alumina, talc, titanium oxide, cellulose polymers, and the like. Fillers are typically present in the amount of from 1% to 60% by weight.

Emulsifiers, which sometimes also have plasticizing properties, include glycerol monostearate, lecithin, and glycerol triacetate. Further, gum bases may also contain optional ingredients such as antioxidants, colors, and flavors.

The insoluble gum base may be present in the amount of from about 5% to 95% by weight of the chewing gum. In one embodiment, the insoluble gum base may present in the amount of from about 10% to 50% by weight of the gum base, and in another embodiment from about 20% to 40% by weight of the gum base.

Softeners are added to the chewing gum in order to optimize the chewability and mouth feel of the gum. Softeners, also known in the art as plasticizers or plasticizing agents, is generally present in amounts from about 0.5% to 15% by weight based on the total weight of the chewing gum composition. Softeners contemplated by the present invention include, for example, lecithin. Further, aqueous sweetener solutions such as those containing sorbitol, hydrogenated starch hydrolysate, corn syrup, and combinations thereof may be used as softeners and binding agents in the gum.

The chewing gum compositions of the present invention may be coated or uncoated and be in the form or slabs, sticks, pellets, balls and the like. The composition of the different forms of the chewing gum compositions will be similar but may vary with regard to the ratio of the ingredients. For example, coated gum compositions may contain a lower percentage of softeners. Pellets and balls have a small chewing gum core, which is then coated with either a sugar solution or a sugarless solution to create a hard shell. Slabs and sticks are usually formulated to be softer in texture than the chewing gum core.

In accordance with one aspect of the chewing gum composition of the present invention, the delivery system is added during the manufacture of the chewing gum composition. In another aspect of the present invention, the delivery system is added as one of the last steps, for example, the last step in the formation of the chewing gum composition. Applicants have determined that this process modification incorporates the delivery system into the gum composition without materially binding the delivery system therein such as may occur if the delivery system is mixed directly with the gum base. Thus, the delivery system, while only loosely contained within the gum composition can more effectively release the active component therefrom during a typical chewing operation. Thus, a material portion of the delivery system is free of the gum base and the corresponding ingredients of the chewing gum.

Coating techniques for applying a coating for a chewing gum composition such as pan and spray coating are well known. In one embodiment, coating with solutions adapted to build a hard candy layer can be employed. Both sugar and sugar alcohols may be used for this purpose together with high intensity sweeteners, colorants, flavorants and binders.

Other components may be added in minor amounts to the coating syrup and include moisture absorbing compounds, anti-adherent compounds, dispersing agents and film forming agents. The moisture absorbing compounds suitable for use in the coating syrups include mannitol or dicalcium phosphate. Examples of useful anti-adherent compounds, which may also function as a filler, include talc, magnesium trisilicate and calcium carbonate. These ingredients may be employed in amounts of from about 0.5% to 5% by weight of the syrup. Examples of dispersing agents, which may be employed in the coating syrup, include titanium dioxide, talc or other anti-adherent compounds as set forth above.

The coating syrup is usually heated and a portion thereof deposited on the cores. Usually a single deposition of the coating syrup is not sufficient to provide the desired amount or thickness of coating and second, third or more coats of the coating syrup may be applied to build up the weight and thickness of the coating to desired levels with layers allowed to dry in-between coats.

A method of preparing the chewing gum composition of the present invention is provided by sequentially adding the various chewing gum ingredients including the delivery system of the present invention to any commercially available mixer known in the art. After the ingredients have been thoroughly mixed, the gum base is discharged from the mixer and shaped into the desired form such as by rolling into sheets and cutting into sticks, extruding into chunks, or casing into pellets.

Generally, the ingredients are mixed by first melting the gum base and adding it to the running mixer. The base may also be melted into the mixer itself. Colors or emulsifiers may also be added at this time. A softener may be added to the mixer at this time, along with syrup and a portion of the bulking agent. Further parts of the bulking agent are then added to the mixer. Flavorants are typically added with the final portion of the bulking agent. Finally, the delivery system exhibiting a predetermeined tensile strength is added to the resulting mixture. Other optional ingredients are added in the batch in a typical fashion, well known to those of ordinary skill in the art.

The entire mixing procedure typically takes from five to fifteen minutes, but longer mixing times may be required. Those skilled in the art will recognize that many variations of the above-described procedure may be follows.

After the ingredients are mixed, the gum mass may be formed into a variety of shapes and products. For example, the ingredients may be formed into pellets or balls and used as cores to make a coated chewing gum product. However, any type of chewing gum product can be utilized with the present invention.

If a coated product is desired, the coating may contain ingredients such as flavorants, artificial sweeteners, dispersing agents, coloring agents, film formers and binding agents. Flavorants contemplated by the present invention, include those commonly known in the art such as essential oils, synthetic flavors, or mixtures thereof, including but are not limited to, oils derived from plants and fruits such as citrus oils, fruit essences, peppermint oil, spearmint oil, other mint oils, clove oil, oil of wintergreen, anise and the like. The flavorants may also be added to the coating syrup in an amount such that the coating may be present in amounts of from about 0.2% to 1.2% by weight flavoring agent. In another embodiment, the coating may be present in amounts, and more preferably from about 0.7% to 1.0% by weight flavoring agent.

Dispersing agents are often added to syrup coatings for the purpose of whitening and tack reduction. Dispersing agents contemplated by the present invention to be employed in the coating syrup include titanium dioxide, talc, or any other anti-stick compound. The dispersing agent may be added to the coating syrup in an amount such that the coating contains from about 0.1% to 1.0%, including 0.2, 0.3, 0.4, 0.5, 0.6, 0.7, 0.8, 0.9 and all values and ranges there between, for example, from about 0.3% to 0.6% by weight of the agent.

Coloring agents may be added directly to the coating syrup in dye or lake form. Coloring agents contemplated by the present invention include food quality dyes. Film formers may be added to the coating syrup include methylcellulose, carboxymethyl cellulose, ethyl cellulose, hydroxyethyl cellulose, and the like or combinations thereof. Binding agents may be added either as an initial coating on the chewing gum center or may be added directly to the coating syrup. Binding agents contemplated by the present invention include gum arabic, gum talha, gelatin, vegetable gums, and the like. The binding agents, when added to the coating syrup, are typically added in amounts from about 0.5% to 10% by weight.

The present invention further encompasses confectionery compositions containing the delivery system of the present invention. Confectionery compositions include, for example, compressed tablets such as mints, hard boiled candies, chocolates, chocolate containing products, nutrient bars, nougats, gels, centerfill confections, fondants, panning goods, consumable thin films and other compositions falling within the generally accepted definition of confectionery compositions.

Confectionery compositions in the form of pressed tablets such as mints may generally be made by combining finely sifted sugar or sugar substitute, flavoring agent (e.g. peppermint flavor) bulking agent such as gum arabic, and an optional coloring agent. The flavoring agent, bulking agent are combined and then gradually the sugar or sugar substitute are added along with a coloring agent if needed.

The product is then granulated by passing through a seize of desired mesh size (e.g. 12 mesh) and then dried typically at temperatures of from about 55° C. to 60° C. The resulting powder is fed into a tableting machine fitted with a large size punch and the resulting pellets are broken into granules and then pressed.

High boiled candies typically contain sugar or sugar substitute, glucose, water, flavoring agent and optional coloring agent. The sugar is dissolved in the water and glucose is then added. The mixture is brought to a boil. The resulting liquid to which may previously have been added a coloring agent is poured onto an oiled slab and cooled. The flavoring agent are then added and kneaded into the cooled mass. The resulting mixture is then fed to a drop roller assembly known in the art to form the final hard candy shape.

A nougat composition typically includes two principal components, a high boiled candy and a frappe. By way of example, egg albumen or substitute thereof is combined with water and whisked to form a light foam. Sugar and glucose are added to water and boiled typically at temperatures of from about 130° C. to 140° C. and the resulting boiled product is poured into a mixing machine and beat until creamy.

The beaten albumen and flavoring agent are combined with the creamy product and the combination is thereafter thoroughly mixed.

Further details regarding the preparation of confectionery compositions can be found in Skuse's Complete Confectioner ($13^{th}$ Edition) (1957) including pp. 41-71, 133-144, and 255-262; and Sugar Confectionery Manufacture ($2^{nd}$ Edition) (1995), E. B. Jackson, Editor, pp. 129-168, 169-188, 189-216, 218-234, and 236-258 each of which is incorporated herein by reference.

EXAMPLE 1

The following study shows the effect of the presence of oil or fats on the overall tensile strength of one embodiment of the delivery system of the present invention. The rate of release of the active component (i.e., aspartame) is affected by the variation in tensile strength such that the release rate of the higher tensile strength delivery system is generally slower than the release rate of lower tensile strength formulations. When relatively large amounts of oil or fat are used, the tensile strength of the delivery system is generally lowered which increases the release rate of the active component.

Conversely, reduced amounts of fats or oils are employed typically for higher tensile strength delivery systems exhibiting lower release rates.

Experimental Procedure

Preparation of the Delivery Systems

Four delivery systems for delivering a high intensity sweetener (i.e., aspartame) containing varying amounts of polyvinyl acetate, and oils or fat were prepared in accordance with the formulations shown in Table 1.

TABLE 1

| Ingredient | Delivery System 1 (20% Fat) | Delivery System 2 (10% Fat) | Delivery System 3 (0% Fat) | Delivery System 4 (5% Fat) |
|---|---|---|---|---|
| Polyvinyl acetate B100 | 50% | 60% | 70% | 65 |
| Hydrogenated Oil | 15% | 7.5% | 0% | 3.5 |
| Glycerol Monostearate | 5% | 2.5% | 0% | 1.5 |
| Aspartame | 30% | 30% | 30% | 30% |
| Tensile Strength (psi) | 10,829 | 24,833 | 22,761 | 42,900 |

Polyvinyl acetate was melted at a temperature of about 110° C. in a continuous extruder. The hydrogenated oil and glycerol monostearate (fat) were added to the molten polyvinyl acetate. Aspartame was then added to the resulting mixture and mixed under high shear to completely disperse the ingredients. The resulting extrudate was cooled and then sized to a particle size of less than 420 microns to produce the corresponding delivery system containing the encapsulated high intensity sweetener aspartame as the active component. The tensile strength of each of the final delivery systems was measured in accordance with ASTM Standard D638-02a and is shown in Table 1.

As indicated in Table 1, the addition of fats and oils exhibits two effects on the tensile strength of the delivery system when a portion of the encapsulating material (polyvinyl acetate) is replaced by the fats and oils. As shown by a comparison of delivery system no. 3 to delivery system no. 4, there is a sharp increase in tensile strength when 5% by weight of polyvinyl acetate is replaced by a corresponding amounts of fats and oils. When the replacement is 10% by weight the tensile strength drops significantly but remains above the level of the fat and oil free delivery system (delivery system no. 1). When fats and oils are used in relatively large amounts (i.e., 20% by weight), the delivery system tends to exhibit a much lower tensile strength as compared to delivery system no. 3.

Preparation of the Chewing Gums

Three sample chewing gum compositions were prepared using the ingredients listed in Table 2 and incorporating delivery system nos. 1 through 3 as shown in Table 1.

TABLE 2

| Ingredient | Chewing Gum 1 | Chewing Gum 2 | Chewing Gum 3 |
|---|---|---|---|
| Gum base | 39.0 | 39.0 | 39.0 |
| Sorbitol | 42.8 | 42.8 | 42.8 |
| Mannitol | 9.0 | 9.0 | 9.0 |
| Flavor | 4.67 | 4.67 | 4.67 |
| Glycerin | 1.5 | 1.5 | 1.5 |
| Lecithin | 0.2 | 0.2 | 0.2 |
| Delivery System 1 | 2.83 | — | — |
| Delivery System 2 | — | 2.83 | — |
| Delivery System 3 | — | — | 2.83 |

The chewing gum composition was prepared as follows. The gum base was melted at a suitable temperature in a mixer. The remaining ingredients were then added to the melted gum base and mixed until the ingredients were completely dispersed. The resulting chewing gum composition was sized and conditioned for about 1 week and evaluated using a pool of human subjects. Each of the human subjects were asked to sample the chewing gum compositions by chewing each of the samples listed in Table 2 and rating the sweetness intensity of each sample at 10 minute intervals over a 30 minute time period. The resulting data is shown in FIG. 1.

Results

As shown in FIG. 1, Gum 3 prepared with fat and oil free delivery system no. 3 provided extended sweetener release with higher sweetener intensity measured at each of the intervals as compared to Gums 1 and 2 each of which contained a delivery system with some level of oil and fat. Gum 1 prepared from delivery system no. 1, which exhibited the lowest tensile strength due in part to its higher oil and fat content, had a relatively short duration of sweetener release and exhibited the lowest sweetener intensity subsequent to the initial release as measured at each of the 10 minute intervals.

It will be understood that each of the chewing gum compositions prepared in accordance with Example 1 could readily be modified to include one or more additional delivery systems each containing a different active component.

EXAMPLE 2

The following study examined the relationship between tensile strength of the delivery system and the release rate of the encapsulated active component. The presence of fats or oils were varied to modify the tensile strength of the delivery system, thereby allowing the release rate of the encapsulated active component to be adjusted as desired.

Experimental Procedure

Preparation of the Delivery Systems

Four delivery systems were prepared using the ingredients listed in Table 3.

TABLE 3

| Ingredient | Delivery System 5 | Delivery System 4 | Delivery System 6 | Delivery System 7 |
|---|---|---|---|---|
| Polyvinyl acetate (High Tensile Strength) | | 65% | | 65% |
| Polyvinyl acetate (Low Tensile Strength) | 63% | | 63% | |
| Hydrogenated Oil | 15% | 3.5% | 15% | 3.5% |
| Glycerol Monostearate | 5% | 1.5% | 5% | 1.5% |
| Aspartame | 17% | 30% | | |
| Acesulfame-K | | | 17% | 30% |
| Tensile Strength (psi) | 6,500 | 42,900 | * | ** |

*not measured but believed to be similar to delivery system no. 5
**not measured but believed to be similar to delivery system no. 4

The above delivery systems (i.e., delivery system nos. 4 to 7) were prepared in the following manner. The polyvinyl acetate encapsulating materials were melted at a temperature of about 110° C. in a continuous extruder. Hydrogenated oil and glycerol monostearate were added to the molten encapsulating materials. The sweetener was then added to the resulting mixture. The mixture was thoroughly mixed under high shear to completely disperse the ingredients to yield an extrudate. The mixed extrudate was thereafter allowed to cool and comminuted to yield particles of the respective delivery systems having a particle size of about less than 600 microns. The delivery systems were each formulated to exhibit a specific tensile strength, in part based on the amount and strength of the polyvinyl acetate and the amount of the fats and oils and other components. The tensile strength of each of delivery system nos. 4 through 7 is listed in Table 3.

Preparation of Chewing Gum Samples

Two test samples of chewing gum compositions referred to herein as Gums 4 and 5 were prepared and formulated with the ingredients listed in Table 4 below. Gum 4 was formulated with a combination of delivery system nos. 5 and 6 shown in Table 3 in the specified amounts to yield a chewing gum having a relatively low tensile strength delivery system. Gum 5 was formulated with a combination of delivery system nos. 4 and 7 in the specified amounts to yield a chewing gum having a relatively high tensile strength delivery system.

TABLE 4

| Ingredient | Chewing Gum 4 | Chewing Gum 5 |
| --- | --- | --- |
| Gum base | 39.0% | 39.0% |
| Sorbitol | 42.5% | 44.3% |
| Mannitol | 9.0% | 9.0% |
| Flavor | 3.67% | 3.67% |
| Glycerin | 1.5% | 1.5% |
| Lecithin | 0.2% | 0.2% |
| Delivery System 5 | 2.94% | — |
| Delivery System 6 | 1.26% | — |
| Delivery System 4 | — | 1.63% |
| Delivery System 7 | — | 0.7% |

The above test sample chewing gums were each prepared in the following manner. The gum base was melted in a mixer. The remaining ingredients were added to the melted gum base. The melted gum base was mixed to completely disperse the ingredients. The resulting chewing gum was allowed to cool. The cooled chewing gum was sized and conditioned for about a week.

It will be understood that each of the chewing gum compositions prepared in accordance with Example 2 could readily be modified to include one or more additional delivery systems each containing a different active component.

Descriptive Panel Evaluation

Sweetness and Bitterness Intensity Analysis

A pool of human subjects was assembled to taste and rate the sweetness intensity of the chewing gum test samples over time. Each of the human subjects were asked to sample by chewing the test sample gums 4 and 5 over a 30 minute period. At each 5-minute interval, the human subjects were asked to rate the perceived sweetness intensity of the chewing gum sampled on a scale of 1 to 10. The results are shown in FIG. 2.

Further to measuring sweetness intensity as perceived by the humans subjects during the chewing, the human subjects were also asked to rate the perceived bitterness intensity of the chewing on a similar scale of 1 to 10. The results are shown in FIG. 4.

Residual Sweetener Analysis

The chewing gums chewed by the human subjects were also subjected to chemical analysis at 5-minute intervals to measure the amount of the residual sweetener remaining in the gum bolus. Every 5 minutes over the 30-minute period, the bolus of the chewing gum was retrieved from each of the human subjects and tested by high-performance liquid chromatography (HPLC). The results are shown in FIG. 3.

Results

Descriptive Panel Results

As shown in FIG. 2, the perceived sweetness intensity of Gum 4 having the lower tensile strength delivery system decreased significantly more rapidly than Gum 5 having the higher tensile strength delivery system over the 30 minute period. From the data presented in FIG. 2, high tensile strength delivery systems tends to extend the duration of sweetener release from the chewing gum.

As shown in FIG. 4, the results indicate that Gum 5 possessing the higher tensile strength delivery system exhibited an initial perceived bitterness intensity that was relatively higher than Gum 4 (i.e., lower tensile strength delivery system). However, over the course of the next 20 minutes, the perceived bitterness in Gum 5 (higher tensile strength) decreased over time, while the perceived bitterness (lower tensile strength) increased over time and remained above the bitter intensity of Gum 5. The results show that the release rate of the sweetener affects the perception of the inherent bitter flavor that may be normally present in chewing gum compositions. The slower release rate of the sweetener in Gum 5 (higher tensile strength) extended the duration of the taste masking over the course of the 25 minutes, thus reducing the perception of bitter taste as compared to Gum 4 (lower tensile strength).

Human Chew-out/Residual Aspartame

As shown in FIG. 3, Gum 4 having a delivery system with a relatively lower tensile strength exhibited a higher rate of sweetener release than Gum 5 having a delivery system with a relatively higher tensile strength over the 30 minute period. Accordingly, by increasing the tensile strength of the delivery system, a lower rate of release of the sweetener can thereby be achieved. Conversely, reducing the tensile strength of the delivery system increases the rate of release of the sweetener. Chewing Gum 4 with the relatively lower tensile strength delivery system further showed a lower residual amount aspartame in the chewed cuds as compared to Gum 5 with the relatively higher tensile strength delivery system. Thus, the data shows that higher tensile strength delivery systems generally provide a slower rate of release of the sweeteners. The results shown in FIG. 3 are consistent with the results shown in FIG. 2 in that faster release of the sweetener results in less sweetener retained in the gum over time.

The forgoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. A method of selecting a delivery system suitable for incorporation into a chewing gum composition, said method comprising:
   determining a desired release rate for an encapsulated active component in the chewing gum composition from the start of chewing the chewing gum composition;
   determining a desired tensile strength for a delivery system associated with said desired release rate for said active component;
   selecting a delivery system for the active component based, at least in part, on said tensile strength of the delivery system and, in part, based on an amount of at least one tensile strength modifying agent in said delivery system; and
   mixing the delivery system with a gum base to yield a chewing gum composition;

wherein the delivery system comprising a mixture of an active component, an encapsulation material, and at least one tensile strength modifying agent;

wherein the active component is encapsulated within the encapsulation material;

wherein the encapsulation material is selected from the group consisting of polyvinyl acetate, polyethylene, crosslinked polyvinyl pyrrolidone, polymethylmethacrylate, polylactic acid, polyhydroxyalkanoates, ethylcellulose, polyvinyl acetate phthalate, polyethylene glycol esters, methacrylicacid-co-methylmethacrylate and combinations thereof; and wherein the at least one tensile strength modifying agent comprises at least one hydrogenated vegetable oil; and wherein the amount of fats and oils in each delivery system is from 1% to 5% by weight of the delivery system.

2. The method of claim 1 further comprising:

determining a second desired release rate for a second active component in the chewing gum composition;

determining a second desired tensile strength for a second delivery system associated with said second desired release rate from the start of chewing the chewing gum composition; and selecting a second delivery system for said second active component based, at least in part, on said second tensile strength.

3. The method of claim 2 further comprising repeating determining a desired release rate, determining a desired tensile strength and selecting a delivery system for at least one additional active component of the chewing gum composition.

4. The method of claim 3, wherein the tensile strength is at least 6,500 psi.

5. The method of claim 3, wherein determining the desired tensile strength comprises:

associating a different tensile strength for each of a plurality of release rates of said at least one active component.

6. The method of claim 5, wherein determining the desired tensile strength comprises:

associating a different tensile strength for each of a plurality of release rates for each of the plurality of active components.

7. The method of claim 5, further comprising:

determining a desired tensile strength for each of a plurality of delivery systems.

8. The method of claim 3, wherein the tensile strength is at least 10,000 psi.

9. The method of claim 3, wherein the tensile strength is at least 22,000 psi.

10. The method of claim 3, wherein the tensile strength is at least 24,000 psi.

11. The method of claim 3, wherein the tensile strength is at least 42,000 psi.

12. The method of claim 3, wherein the active component is selected from the group consisting of a sweetener, an acid, a flavorant, a pharmaceutical, a therapeutic agent, a vitamin, a breath freshener, a cooling agent and combinations thereof.

13. The method of claim 3, wherein the active component is a high intensity sweetener.

14. The method of claim 3, wherein the active component is a sweetener and is selected from the group consisting of a dipeptide sweetener, glycyrrhizin, saccharin, a saccharin salt, an acesulfame salt, a cyclamate, a stevioside, talin, a dihydrochalone compound, a chlorinated sucrose polymer, and combinations thereof.

15. The method of claim 13, wherein the high intensity sweetener is selected from the group consisting of neotame, aspartame, sucralose and a mixture thereof.

16. The method of claim 1, wherein the tensile strength modifying agent further comprises glycerol monostearate.

* * * * *